US008266913B2

(12) United States Patent
Snook et al.

(10) Patent No.: US 8,266,913 B2
(45) Date of Patent: *Sep. 18, 2012

(54) POWER PLANT AND METHOD OF USE

(75) Inventors: Daniel David Snook, Greenville, SC (US); Lisa Anne Wichmann, Greenville, SC (US); Samuel David Draper, Greenville, SC (US); Noémie Dion Ouellet, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,686

(22) Filed: Aug. 25, 2011

(65) Prior Publication Data

US 2012/0023959 A1 Feb. 2, 2012

(51) Int. Cl.
*F02C 1/00* (2006.01)
(52) U.S. Cl. .......................... 60/772; 60/39.52
(58) Field of Classification Search .................. 60/39.5, 60/39.52, 224–225, 806
See application file for complete search history.

(56) References Cited

U.S. PATENT DOCUMENTS

| 2,621,475 | A | * | 12/1952 | Loy ................................ 60/774 |
|---|---|---|---|---|
| 2,646,663 | A | | 7/1953 | Sedille |
| 3,685,287 | A | | 8/1972 | Dooley |
| 3,866,411 | A | | 2/1975 | Marion et al. |
| 3,949,548 | A | | 4/1976 | Lockwood, Jr. |
| 4,267,692 | A | | 5/1981 | Earnest |
| 4,271,664 | A | | 6/1981 | Earnest |
| 4,313,300 | A | | 2/1982 | Wilkes et al. |
| 4,330,038 | A | | 5/1982 | Soukup et al. |
| 4,434,613 | A | | 3/1984 | Stahl |
| 4,492,085 | A | | 1/1985 | Stahl et al. |
| 4,528,811 | A | | 7/1985 | Stahl |
| 4,533,314 | A | | 8/1985 | Herberling |
| 4,561,245 | A | | 12/1985 | Ball |
| 4,566,267 | A | | 1/1986 | Muller et al. |
| 5,165,606 | A | | 11/1992 | Pelet |

(Continued)

FOREIGN PATENT DOCUMENTS

EP  1731833 A1  12/2006

(Continued)

OTHER PUBLICATIONS

Bandar Duraya Al-Anazi, "Enhanced Oil Recovery Techniques and Nitrogen Injection," CSEG Recorder, Oct. 2007, pp. 28-33.

(Continued)

*Primary Examiner* — Phutthiwat Wongwian
(74) *Attorney, Agent, or Firm* — Sutherland Asbill & Brennan LLP

(57) ABSTRACT

A power plant arrangement and method of operation are provided. The power plant arrangement comprises at lease one main air compressor and one or more gas turbine assemblies. Each assembly comprises a turbine combustor for mixing a portion of a compressed ambient gas flow with a portion of a recirculated low oxygen content gas flow and a fuel stream, and burning the combustible mixture to form the recirculated low oxygen content flow. The assembly further comprises a turbine compressor, fluidly connected to the turbine combustor, and connected to a turbine shaft that is arranged to be driven by rotation of a turbine. The assembly also comprises a recirculation loop for recirculating at least a portion of the recirculated low oxygen content gas flow from the turbine to the turbine compressor.

18 Claims, 19 Drawing Sheets

U.S. PATENT DOCUMENTS

| | | | |
|---|---|---|---|
| 5,361,576 A | 11/1994 | Muller | |
| 5,400,587 A | 3/1995 | Keler et al. | |
| 5,426,932 A | 6/1995 | Morihara et al. | |
| 5,557,919 A | 9/1996 | Althaus | |
| 5,564,896 A | 10/1996 | Beeck et al. | |
| 5,584,182 A | 12/1996 | Althaus et al. | |
| 5,595,059 A | 1/1997 | Huber et al. | |
| 5,674,066 A | 10/1997 | Hausermann et al. | |
| 5,724,805 A * | 3/1998 | Golomb et al. | 60/783 |
| 5,794,431 A | 8/1998 | Utamura et al. | |
| 5,809,768 A * | 9/1998 | Uematsu et al. | 60/39.465 |
| 6,050,082 A | 4/2000 | Leonard et al. | |
| 6,082,093 A | 7/2000 | Greenwood et al. | |
| 6,105,362 A | 8/2000 | Ohtomo | |
| 6,202,400 B1 | 3/2001 | Utamura et al. | |
| 6,256,976 B1 | 7/2001 | Kataoka et al. | |
| 6,269,624 B1 | 8/2001 | Frutschi et al. | |
| 6,289,666 B1 | 9/2001 | Ginter | |
| 6,338,240 B1 | 1/2002 | Endo et al. | |
| 6,363,709 B2 | 4/2002 | Kataoka et al. | |
| 6,430,915 B1 | 8/2002 | Wiant et al. | |
| 6,622,470 B2 | 9/2003 | Viteri et al. | |
| 6,637,183 B2 | 10/2003 | Viteri et al. | |
| 6,848,249 B2 | 2/2005 | Coleman et al. | |
| 6,851,266 B2 | 2/2005 | Liebig | |
| 6,868,677 B2 | 3/2005 | Viteri et al. | |
| 6,910,335 B2 | 6/2005 | Viteri et al. | |
| 7,007,487 B2 | 3/2006 | Belokon | |
| 7,032,388 B2 | 4/2006 | Healy | |
| 7,089,743 B2 | 8/2006 | Frutschi | |
| 7,127,898 B2 | 10/2006 | Healy | |
| 7,383,686 B2 | 6/2008 | Aycock et al. | |
| 7,490,472 B2 * | 2/2009 | Lynghjem et al. | 60/772 |
| 7,503,178 B2 | 3/2009 | Bücker | |
| 7,516,609 B2 * | 4/2009 | Agnew | 60/39.52 |
| 7,726,114 B2 | 6/2010 | Evulet | |
| 7,739,864 B2 | 6/2010 | Finkenrath et al. | |
| 7,895,822 B2 | 3/2011 | Hoffmann et al. | |
| 2003/0051481 A1 | 3/2003 | Priestley et al. | |
| 2004/0011057 A1 | 1/2004 | Huber | |
| 2004/0134194 A1 | 7/2004 | Roby et al. | |
| 2005/0028529 A1 * | 2/2005 | Bartlett et al. | 60/772 |
| 2005/0150229 A1 | 7/2005 | Baer et al. | |
| 2007/0006592 A1 * | 1/2007 | Balan et al. | 60/772 |
| 2007/0034171 A1 * | 2/2007 | Griffin et al. | 122/479.1 |
| 2007/0068167 A1 | 3/2007 | Patel et al. | |
| 2007/0125063 A1 | 6/2007 | Evulat | |
| 2007/0125064 A1 | 6/2007 | Sonoda | |
| 2007/0125091 A1 | 6/2007 | Roby et al. | |
| 2007/0220896 A1 | 9/2007 | Varatharajan et al. | |
| 2008/0010967 A1 | 1/2008 | Griffin et al. | |
| 2008/0104938 A1 | 5/2008 | Finkenrath et al. | |
| 2008/0104939 A1 | 5/2008 | Hoffmann et al. | |
| 2008/0120960 A1 | 5/2008 | Agnew | |
| 2008/0309087 A1 * | 12/2008 | Evulet et al. | 290/52 |
| 2009/0199566 A1 | 8/2009 | Lebas et al. | |
| 2009/0218821 A1 | 9/2009 | Elkady et al. | |
| 2009/0280003 A1 | 11/2009 | Schriner et al. | |
| 2009/0284013 A1 | 11/2009 | Anand et al. | |
| 2009/0301054 A1 | 12/2009 | Simpson et al. | |
| 2010/0018218 A1 | 1/2010 | Riley et al. | |
| 2010/0115960 A1 | 5/2010 | Brautsch et al. | |
| 2010/0126181 A1 | 5/2010 | Ranasinghe et al. | |
| 2010/0170218 A1 | 7/2010 | Eluripati et al. | |
| 2010/0180565 A1 | 7/2010 | Draper | |
| 2011/0067408 A1 | 3/2011 | Maly | |
| 2011/0138766 A1 * | 6/2011 | ElKady et al. | 60/39.24 |
| 2011/0289898 A1 | 12/2011 | Hellat et al. | |

FOREIGN PATENT DOCUMENTS

| | | |
|---|---|---|
| EP | 2078827 A1 | 7/2009 |
| EP | 2206959 A2 | 7/2010 |

OTHER PUBLICATIONS

Disclosure under 37 CFR 1.56 for U.S. Appl. No. 13/217,686, filed Jul. 3, 2012.

* cited by examiner

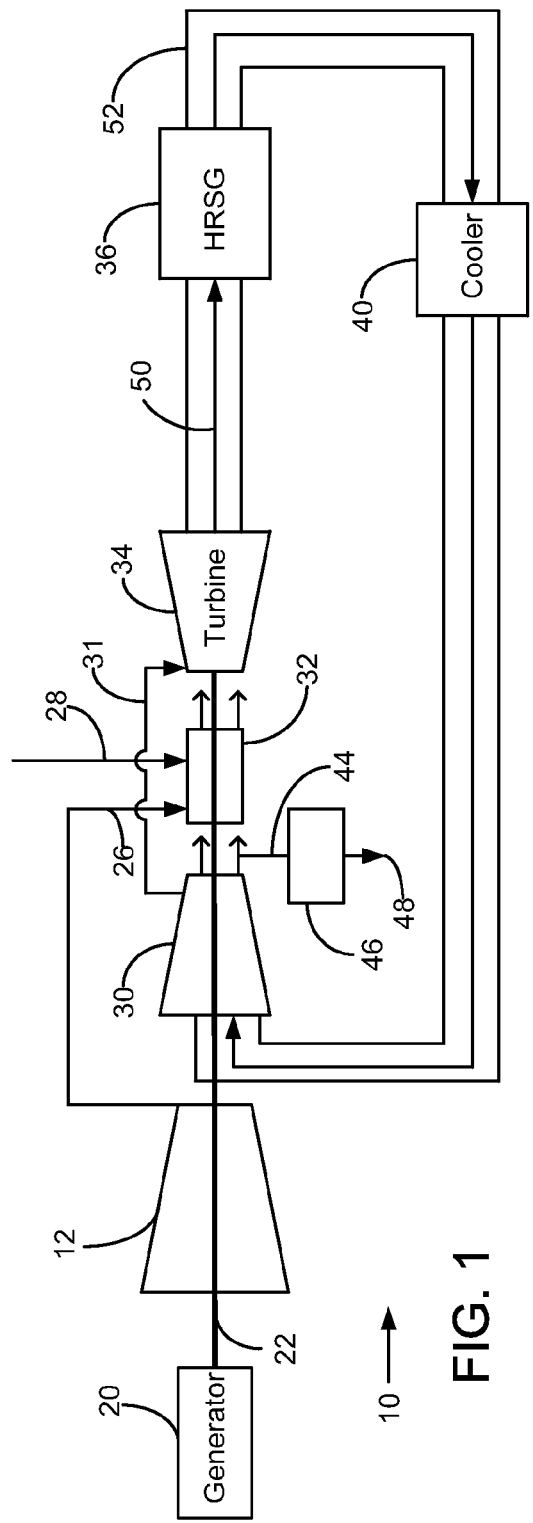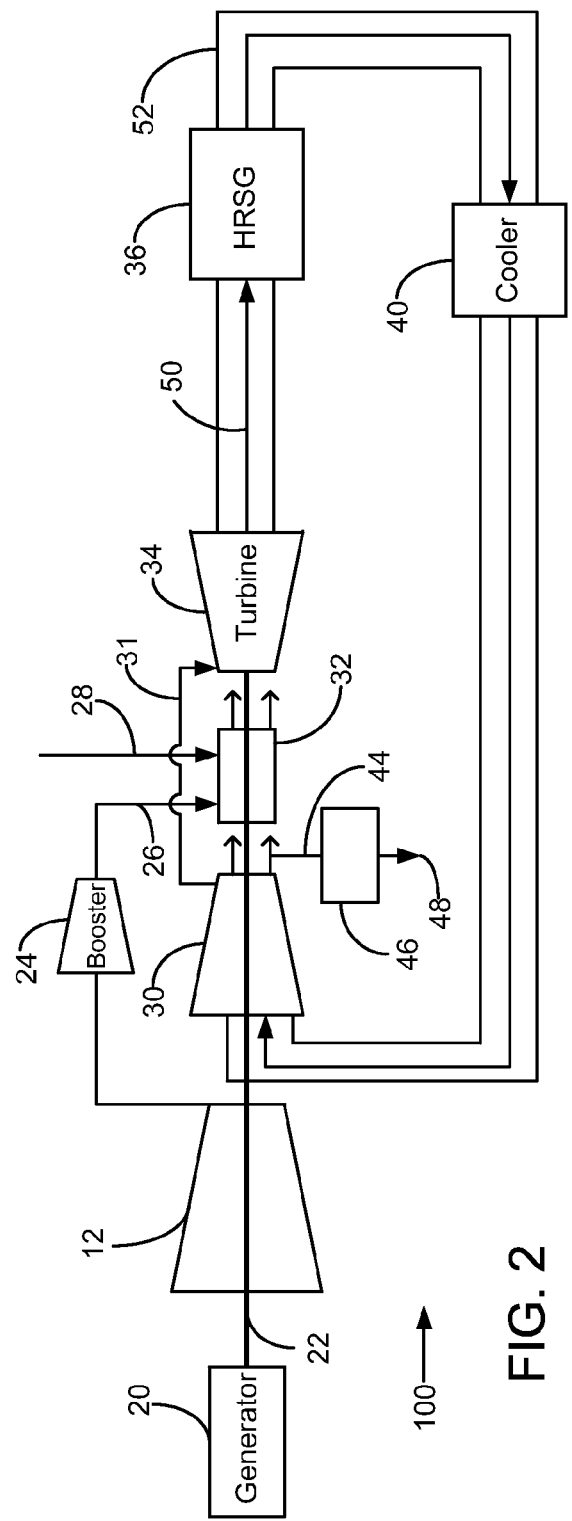

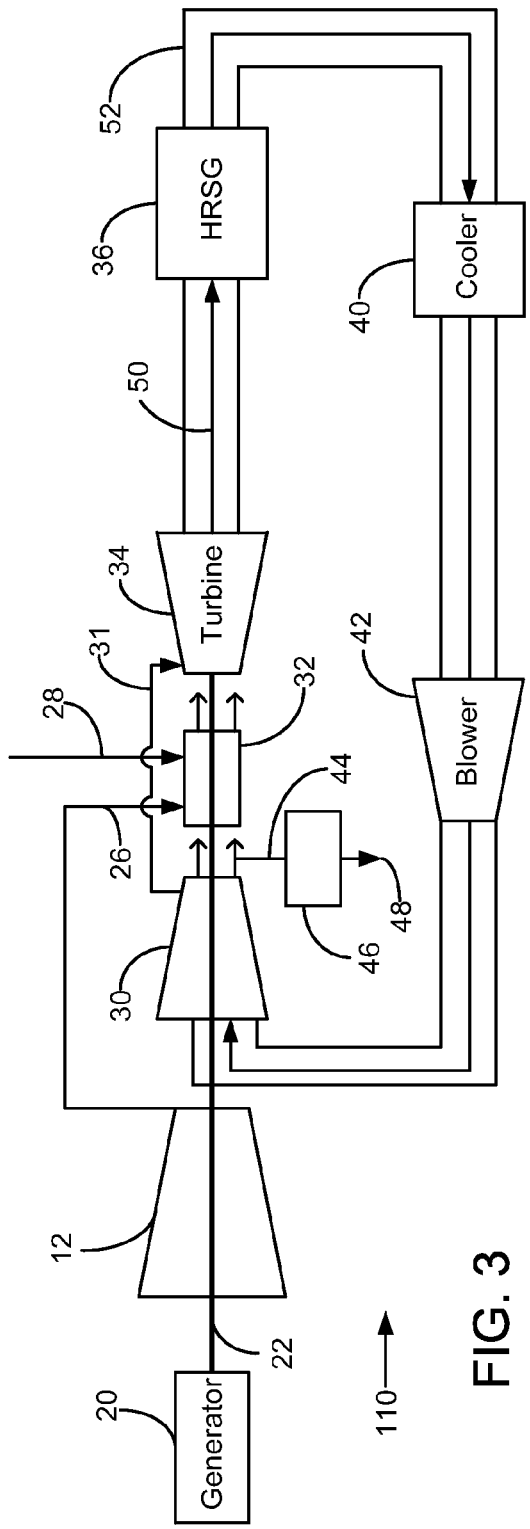
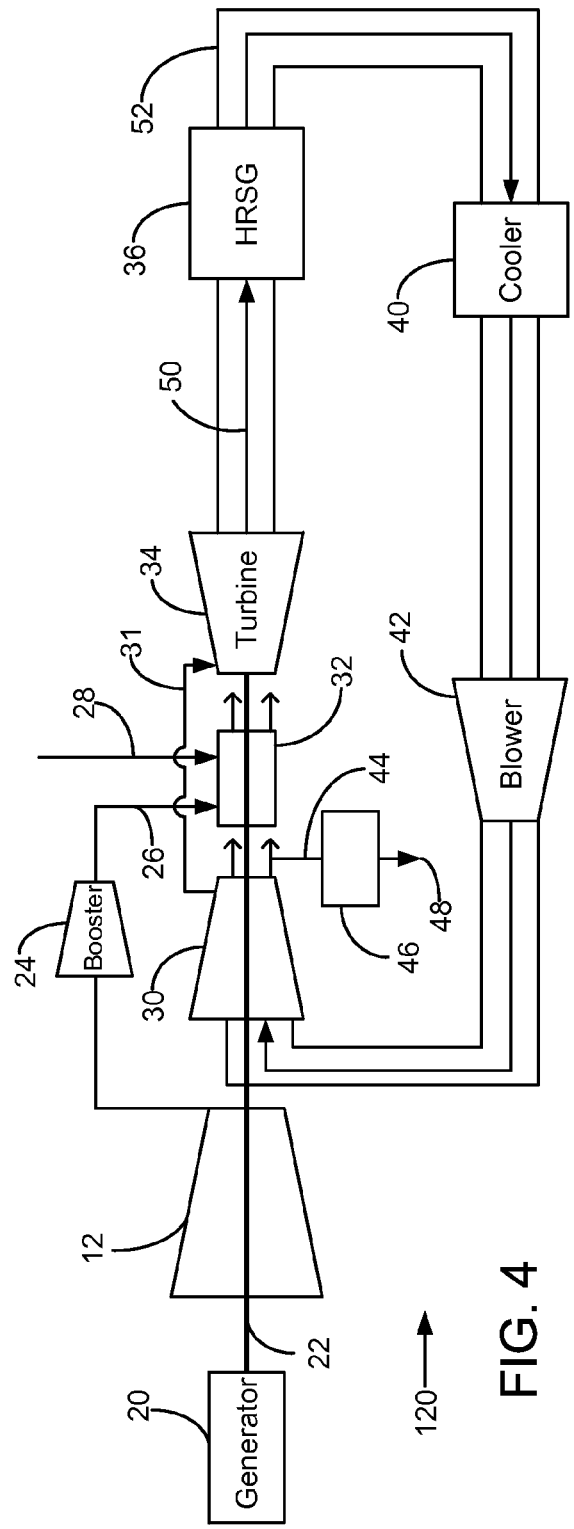
FIG. 3
FIG. 4

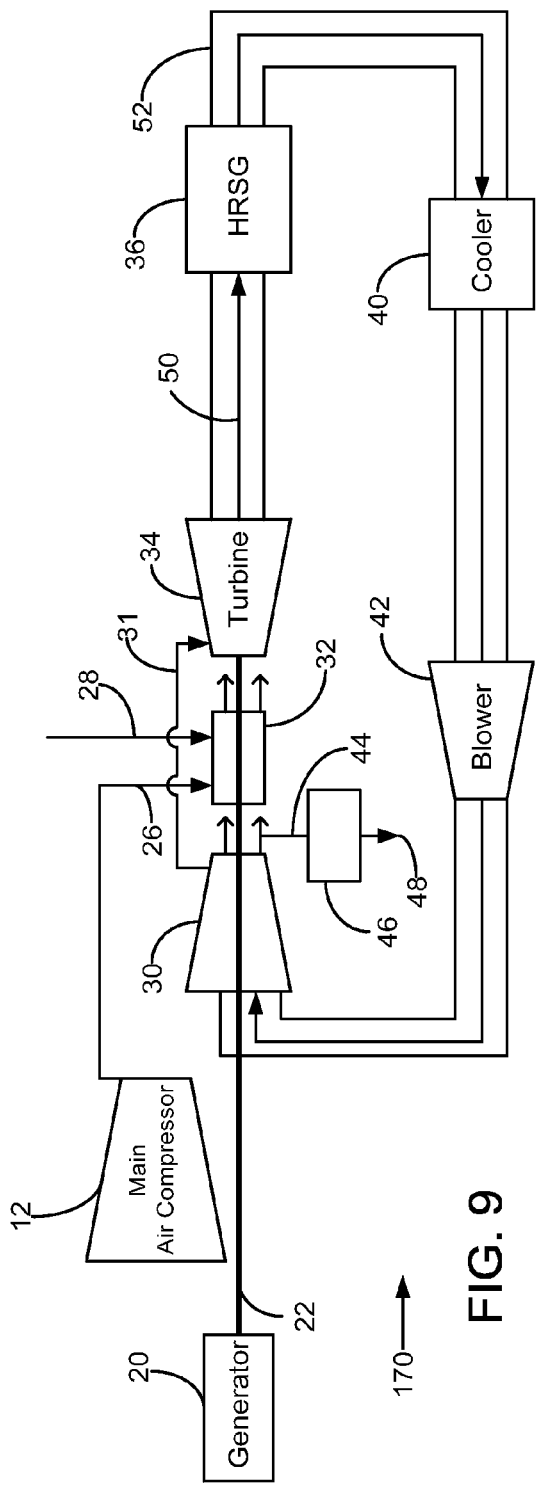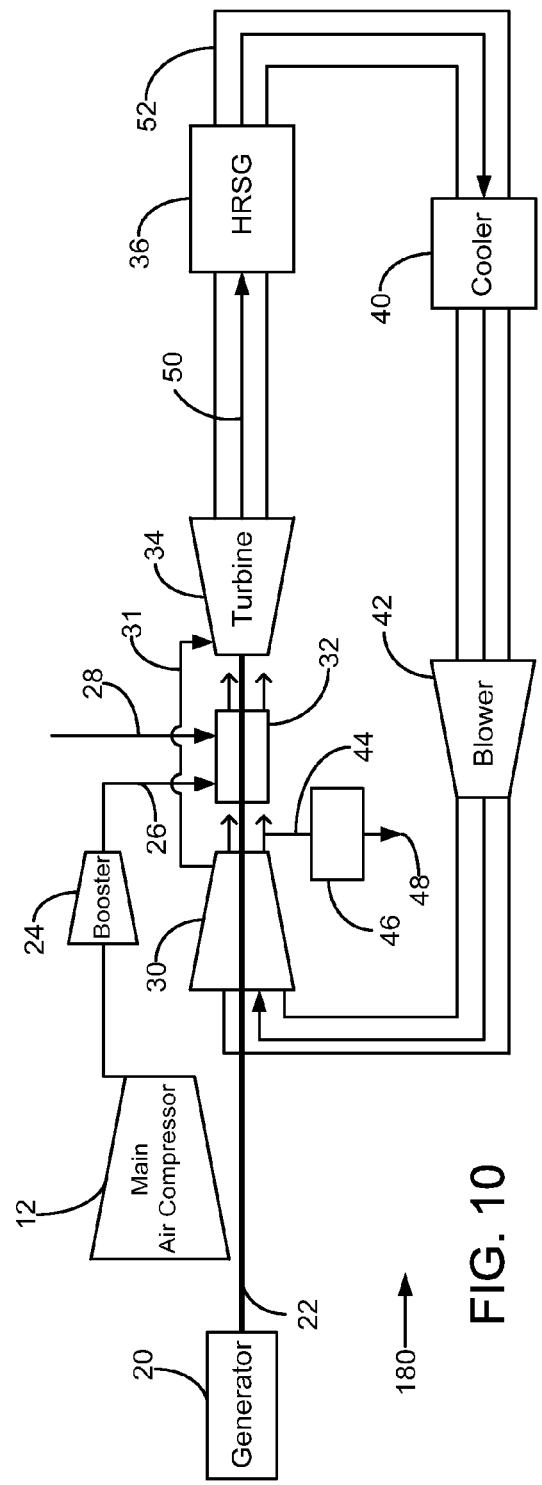

POWER PLANT AND METHOD OF USE

BACKGROUND OF THE INVENTION

The subject matter of the present disclosure relates generally to the field of electric power plants, and more particularly to methods of operating stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a power plant arrangement is provided. The power plant arrangement comprises at least one main air compressor for compressing ambient air into a compressed ambient gas flow and one or more gas turbine assemblies. Each gas turbine assembly comprises a turbine combustor, fluidly connected to the at least one main air compressor, for mixing at least a first portion of the compressed ambient gas flow with at least a first portion of a recirculated low oxygen content gas flow and a fuel stream to form a combustible mixture and for burning the combustible mixture and forming the recirculated low oxygen content gas flow. The gas turbine assembly further comprises a turbine connected to the turbine combustor and to a turbine shaft. The turbine is arranged to be driven by the recirculated low oxygen content gas flow from the turbine combustor. The assembly further comprises a turbine compressor, fluidly connected to the turbine combustor, and connected to the turbine shaft and is arranged to be driven thereby. The assembly also comprises a recirculation loop for recirculating at least a portion of the recirculated low oxygen content gas flow from the turbine to the turbine compressor.

In another aspect, a method for operating a power plant is provided. The method comprises compressing ambient air with at least one main air compressor to form a compressed ambient gas flow, delivering at least a first portion of the compressed ambient gas flow to at least one gas turbine assembly, and mixing the at least a first portion of the compressed ambient gas flow with at least a first portion of a recirculated low oxygen content gas flow and a fuel stream to form a combustible mixture and burning the mixture in a turbine combustor to produce the recirculated low oxygen content gas flow. The method further comprises driving a turbine, connected to a turbine shaft, using the recirculated low oxygen content gas flow and driving a turbine compressor, via the turbine shaft, which is fluidly connected to the turbine combustor. The method also comprises recirculating at least a portion of the recirculated low oxygen content gas flow from the turbine to the turbine compressor using a recirculation loop.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein:

FIG. 1 is a diagrammatical illustration of an exemplary power plant arrangement 10 in accordance with an embodiment of the present invention.

FIG. 2 is a diagrammatical illustration of an exemplary configuration 100 of the exemplary power plant arrangement of FIG. 1 in accordance with an embodiment of the present invention.

FIG. 3 is a diagrammatical illustration of another exemplary configuration 110 of the exemplary power plant arrangement of FIG. 1 in accordance with an embodiment of the present invention.

FIG. 4 is a diagrammatical illustration of another exemplary configuration 120 of the exemplary power plant arrangements of FIGS. 1-3 in accordance with an embodiment of the present invention.

FIG. 9 is a diagrammatical illustration of another exemplary configuration 170 of the exemplary power plant arrangements of FIGS. 1, 3, and 7 in accordance with an embodiment of the present invention.

FIG. 10 is a diagrammatical illustration of another exemplary configuration 180 of the exemplary power plant arrangements of FIGS. 1-3 and 7 in accordance with an embodiment of the present invention.

DETAILED DESCRIPTION OF THE INVENTION

Figure 5:
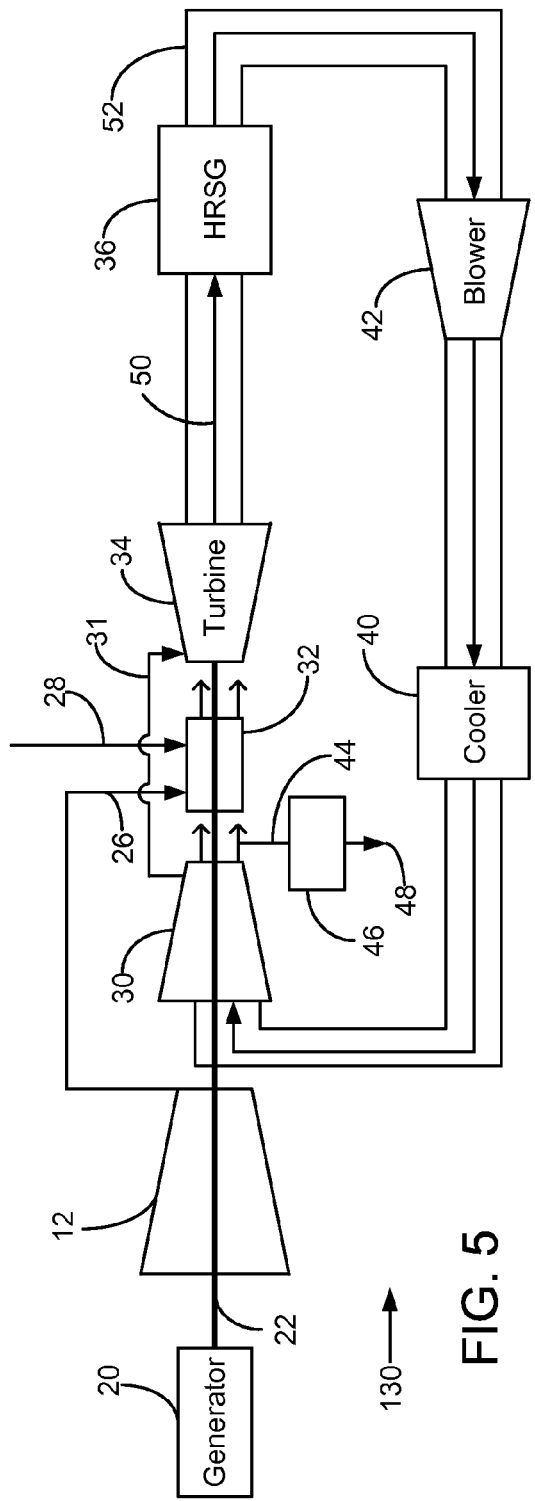
FIG. 5 is a diagrammatical illustration of another exemplary configuration 130 of the exemplary power plant arrangements of FIGS. 1 and 3 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, a largely oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates at near combustion stoichiometry.

A stoichiometric combustion reaction of methane and oxygen is illustrated below:

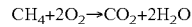

$$CH_4 + 2O_2 \rightarrow CO_2 + 2H_2O$$

Stoichiometric combustion results in gas temperatures that may be too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be significantly oxygen free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. It some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

Power Plant Arrangements

Turning now to the drawings and referring first to FIG. 1 an exemplary power plant arrangement 10 is illustrated. The exemplary power plant arrangement 10 may include a main air compressor 12 for compressing ambient air into at least a first portion of a compressed ambient gas flow 26. Further, the exemplary power plant arrangement 10 may include a turbine combustor 32 that may be fluidly connected to the main air compressor 12. The turbine combustor 32 may be configured to receive the at least a first portion of the compressed ambient gas flow 26 from the main air compressor 12, at least a portion of a recirculated low oxygen content gas flow 50 from a turbine compressor 30, and a fuel stream 28, to form a combustible mixture and to burn the combustible mixture to generate the recirculated low oxygen content gas flow 50. In addition, the power plant arrangement 10 may include a turbine 34 located downstream of the turbine combustor 32. The turbine 34 may be configured to expand the recirculated low oxygen content gas flow 50 and may drive an external load such as a turbine generator 20 via a turbine shaft 22 to generate electricity. In the illustrated embodiment 10, the main air compressor 12 and the turbine compressor 30 may be driven by the power generated by the turbine 34 via the turbine shaft 22.

As used herein, the term "recirculated low oxygen content gas flow" refers to the gas flow generated by the burning of the combustible mixture in the turbine combustor 32 and flowing through a recirculation loop 52. In some embodiments, the term "low oxygen content" refers to an oxygen content of below about 5 vol %, below about 2 vol %, or below about 1 vol %.

As used herein, the term "gas turbine assembly" refers to all listed components of the power plant arrangements except for the main air compressor 12. In embodiments comprising multiple main air compressors, the term "gas turbine assembly" refers to all listed components of the power plant arrangements except for the multiple main air compressors.

In some embodiments, the gas turbine assembly may further comprise a secondary flow path 31 that may deliver at least a portion of the recirculated low oxygen content gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the recirculated low oxygen content gas flow 50 may be directed from the turbine combustor 32 through the recirculation loop 52 to a heat recovery steam generator 36 for the generation of steam. A steam turbine may be further configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to a recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34. In still other embodiments, the recirculation loop 52 may not comprise the recirculated gas flow cooler 40.

The recirculated gas flow cooler 40 may be incorporated into the recirculation loop 52 anywhere downstream of the turbine 34. The recirculated gas flow cooler 40 may be configured to lower the temperature of the recirculated low oxygen content gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, the exemplary power plant arrangement 10 may include a recirculated gas flow extraction unit 46 located downstream of the turbine compressor 30 and may be fluid connection with at least a portion of the recirculated low oxygen content gas flow 50 via a turbine compressor output flow 44. In some embodiments, the recirculated gas flow extraction unit 46 may be fluidly connected to a gas separation system via an extraction conduit 48. In some embodiments, the gas separation system may produce at least a first process stream of concentrated carbon dioxide and a second process stream of concentrated nitrogen, both with a low oxygen content. In some embodiments, the gas separation system may be, for instance, a carbon capture sequestration (CCS) system. In some embodiments, the recirculated gas flow extraction unit 46 may be attached to any point of the recirculation loop 52.

As illustrated by FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

FIG. 2 is a diagrammatical illustration of an exemplary configuration 100 of the exemplary power plant arrangement 10 of FIG. 1. As discussed with reference to FIG. 1, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32.

FIG. 3 is a diagrammatical illustration of an exemplary configuration 110 of the exemplary power plant arrangement 10 of FIG. 1. As discussed with reference to FIG. 1, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

FIG. 4 is a diagrammatical illustration of an exemplary configuration 120 of the exemplary power plant arrangement 10 of FIG. 1. As discussed with reference to FIGS. 1, 2, and 3, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

FIG. 5 is a diagrammatical illustration of an exemplary configuration 130 of the exemplary power plant arrangement 10 of FIG. 1. As discussed with reference to FIGS. 1 and 3, in some embodiments, a blower 42 may be fluidly connected to the recirculation loop 52 upstream of the recirculated gas flow cooler 40. The blower 42 may be configured to increase the pressure of the recirculated low oxygen content gas flow 50 prior to delivery into the recirculated gas flow cooler 40 via the recirculation loop 52.

Figure 6:
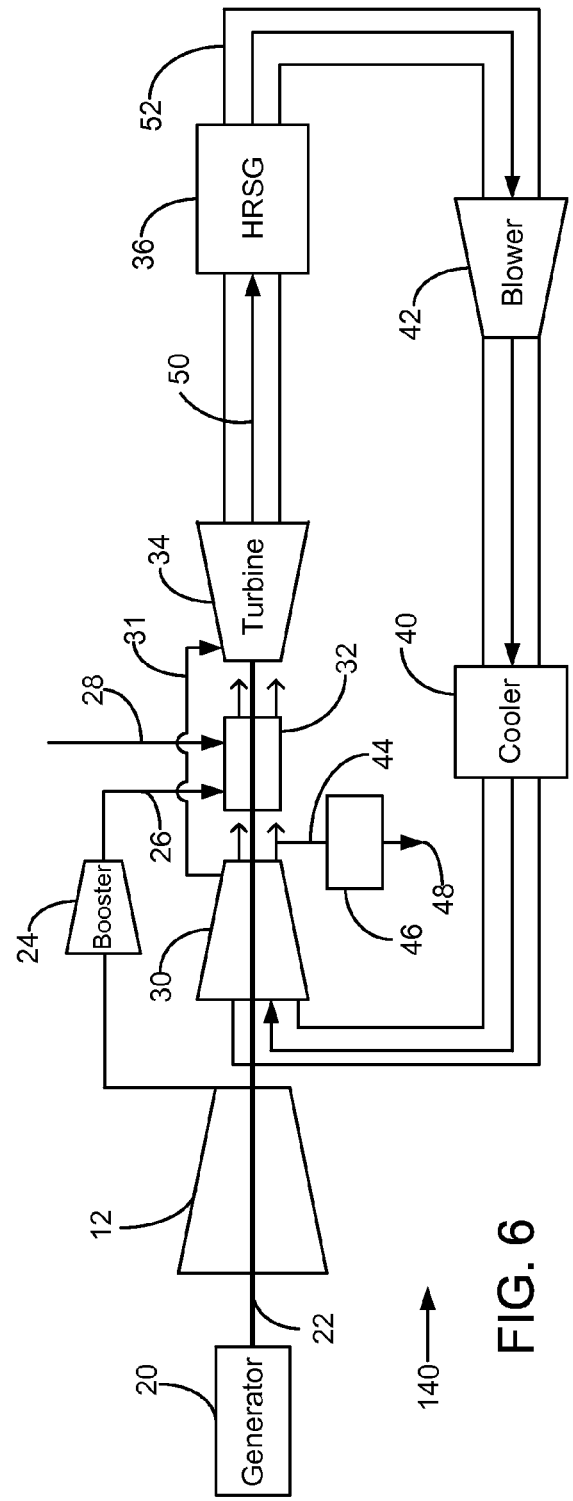
FIG. 6 is a diagrammatical illustration of another exemplary configuration 140 of the exemplary power plant arrangements of FIGS. 1, 2, and 5 in accordance with an embodiment of the present invention.

FIG. 6 is a diagrammatical illustration of an exemplary configuration 140 of the exemplary power plant arrangement 10 of FIG. 1. As discussed with reference to FIGS. 1, 2, and 5, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 upstream of the recirculated gas flow cooler 40. The blower 42 may be configured to increase the pressure of the recirculated low oxygen content gas flow 50 prior to delivery into the recirculated gas flow cooler 40 via the recirculation loop 52.

Figure 7:
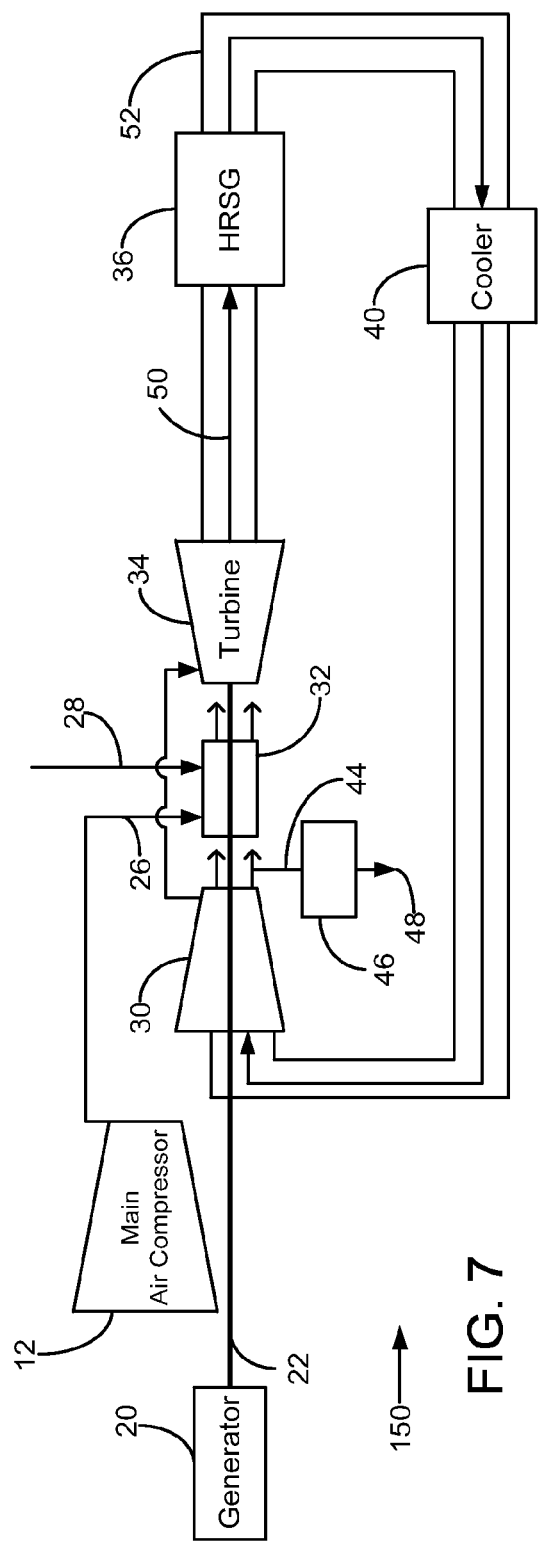
FIG. 7 is a diagrammatical illustration of another exemplary configuration 150 of the exemplary power plant arrangement of FIG. 1 in accordance with an embodiment of the present invention.

FIG. 7 is a diagrammatical illustration of an exemplary configuration 150 of the exemplary power plant arrangement 10 of FIG. 1. As discussed with reference to FIG. 1, in some embodiments, the main air compressor 12 may not be driven by the power generated by the turbine 34 via the turbine shaft 22. Furthermore, in some embodiments, the main air compressor 12 may not be connected to the turbine shaft 22.

Figure 8:
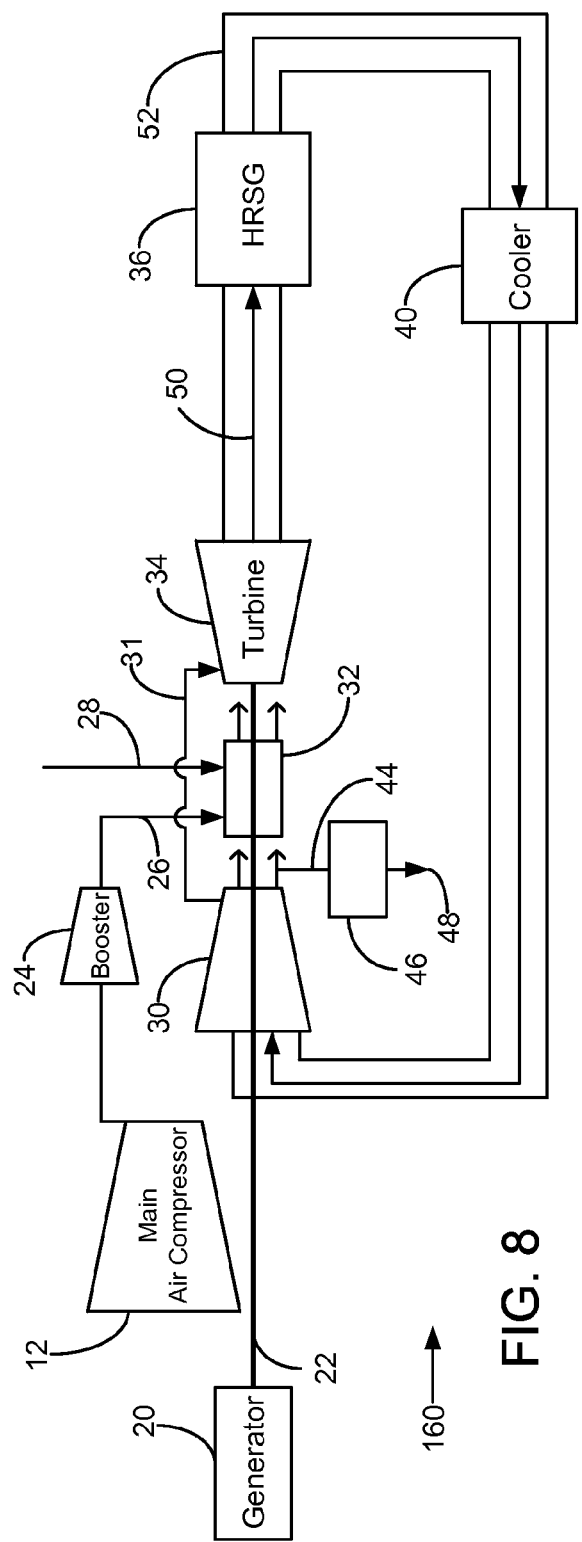
FIG. 8 is a diagrammatical illustration of another exemplary configuration 160 of the exemplary power plant arrangements of FIGS. 1, 2, and 7 in accordance with an embodiment of the present invention.

FIG. 8 is a diagrammatical illustration of an exemplary configuration 160 of the exemplary power plant arrangement 10 of FIG. 1. As discussed with reference to FIGS. 1, 2, and 7, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32.

FIG. 9 is a diagrammatical illustration of an exemplary configuration 170 of the exemplary power plant arrangement 10 of FIG. 1. As discussed with reference to FIGS. 1, 3, and 7, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

FIG. 10 is a diagrammatical illustration of an exemplary configuration 180 of the exemplary power plant arrangement 10 of FIG. 1. As discussed with reference to FIGS. 1, 2, 3, and 7, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

Figure 11:
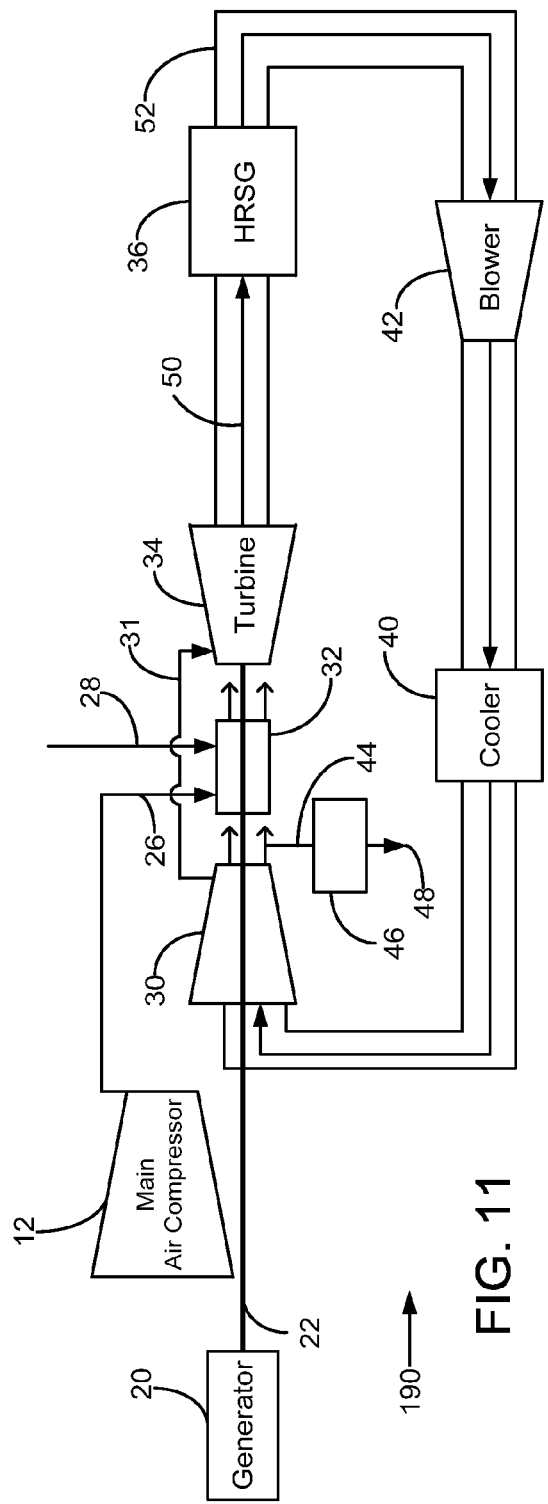
FIG. 11 is a diagrammatical illustration of another exemplary configuration 190 of the exemplary power plant arrangements of FIGS. 1, 5, and 7 in accordance with an embodiment of the present invention.

FIG. 11 is a diagrammatical illustration of an exemplary configuration 190 of the exemplary power plant arrangement 10 of FIG. 1. As discussed with reference to FIGS. 1, 5, and 7, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a blower 42 may be fluidly connected to the recirculation loop 52 upstream from the recirculated gas flow cooler 40. The blower 42 may be configured to increase the pressure of the recirculated low oxygen content gas flow 50 prior to delivery into the recirculated gas flow cooler 40 via the recirculation loop 52.

Figure 12:
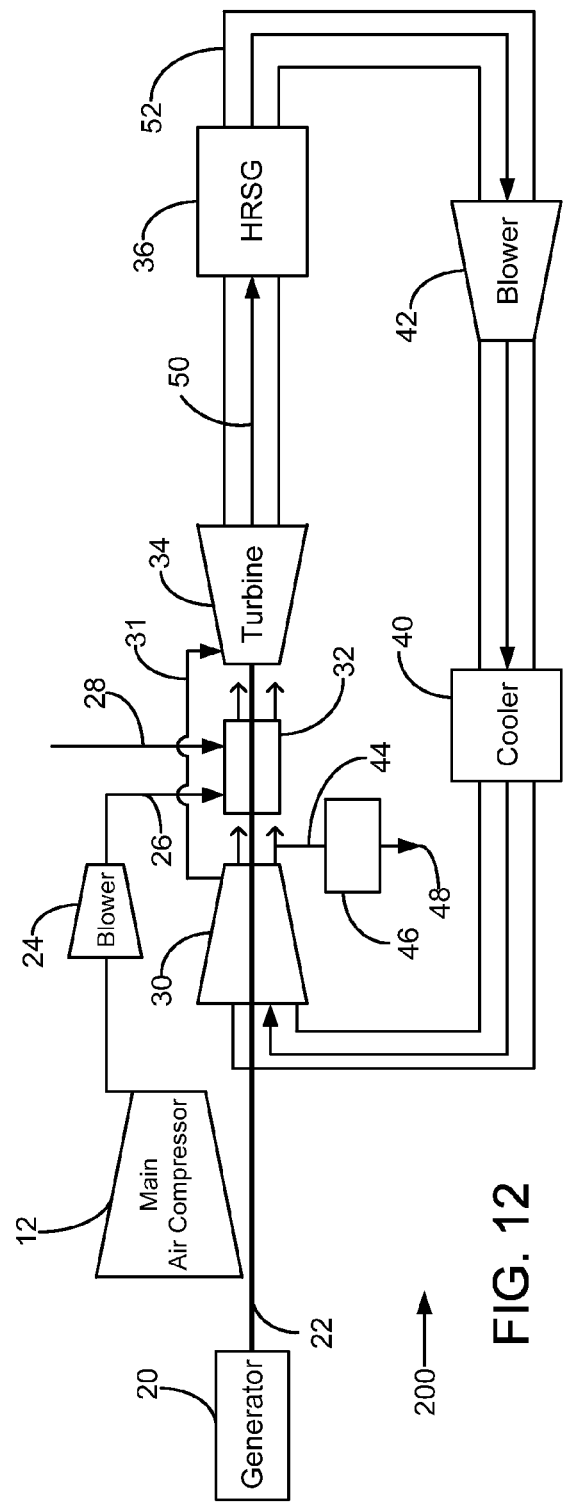
FIG. 12 is a diagrammatical illustration of another exemplary configuration 200 of the exemplary power plant arrangements of FIGS. 1, 6, and 7 in accordance with an embodiment of the present invention.

FIG. 12 is a diagrammatical illustration of an exemplary configuration 200 of the exemplary power plant arrangement 10 of FIG. 1. As discussed with reference to FIGS. 1, 6, and 7, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 upstream from the recirculated gas flow cooler 40. The blower 42 may be configured to increase the pressure of the recirculated low oxygen content gas flow 50 prior to delivery into the recirculated gas flow cooler 40 via the recirculation loop 52.

As used herein, the term "slave" is synonymous with the terms secondary, auxiliary, or additional. In the following embodiments, the term "slave" refers to the second of two gas turbine assemblies, but can also mean any additional gas turbine assemblies operated with a main gas turbine assembly such as is the second gas turbine assembly in the following embodiments. Additionally, the term "master train" is synonymous with a first gas turbine assembly that may be mechanically connected to the main air compressor 12. The term "slave train" may also refer to the second of two or more gas turbine assemblies.

Figure 13:
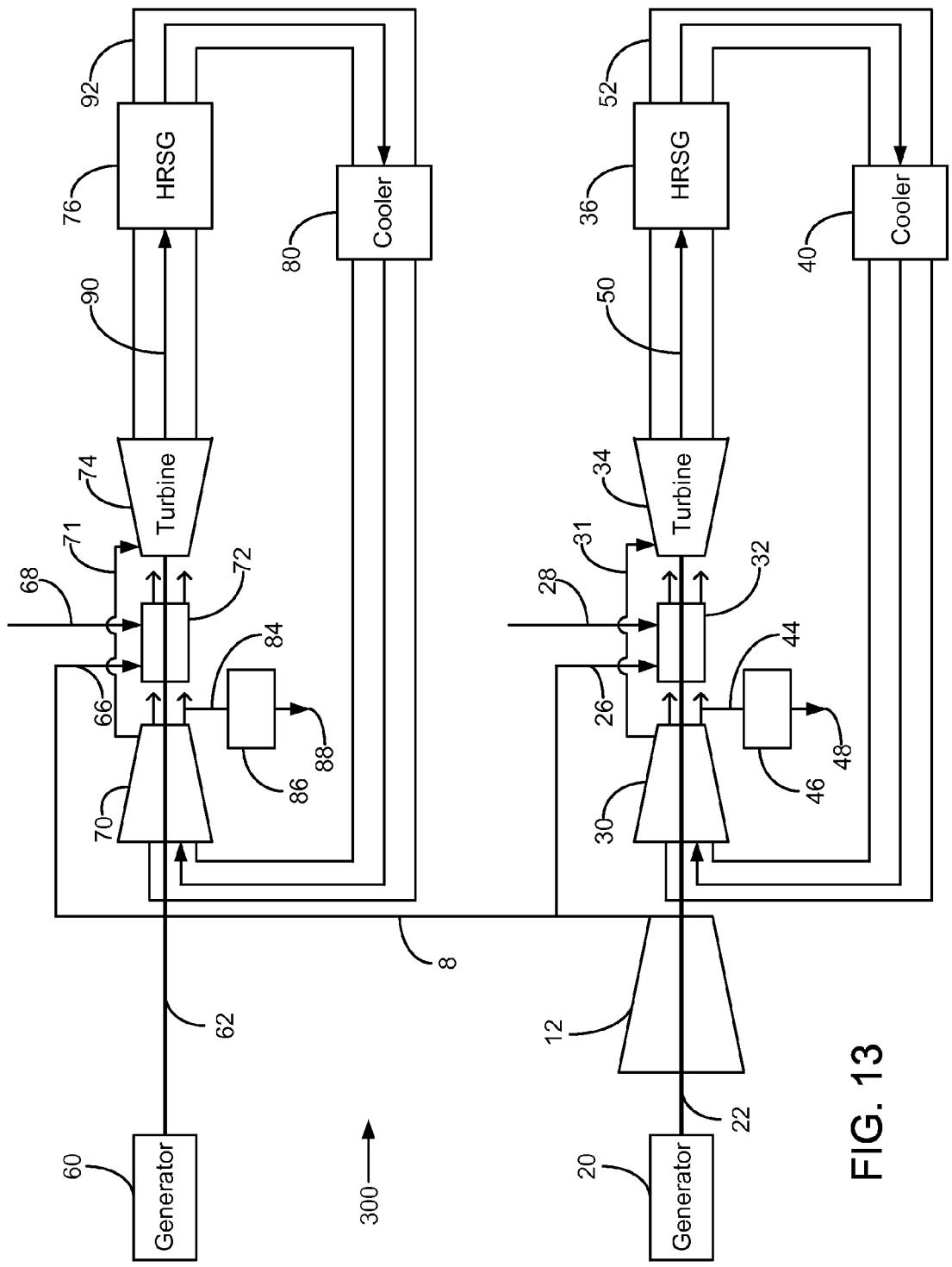
FIG. 13 is a diagrammatical illustration of an exemplary power plant arrangement 300 in accordance with an embodiment of the present invention.

FIG. 13 is a diagrammatical illustration of another exemplary power plant arrangement 300 in accordance with aspects of the present invention. As discussed with reference to FIG. 1, the main air compressor 12 may deliver compressed ambient gas to a slave turbine combustor 72 that may be fluidly connected to the main air compressor 12 via an inter-train conduit 8. The slave turbine combustor 72 may be configured to receive the at least a second portion of the compressed ambient gas flow 66 from the main air compressor 12, at least a first portion of a slave recirculated low oxygen content gas flow 90 from a slave turbine compressor 70, and a slave fuel stream 68, to form a slave combustible mixture and to burn the slave combustible mixture to generate the slave recirculated low oxygen content gas flow 90. In addition, the exemplary power plant arrangement 300 may include a slave turbine 74 located downstream of the slave turbine combustor 72. The slave turbine 74 may be configured to expand the slave recirculated low oxygen content gas flow 90 and may drive an external load such as a slave turbine generator 60 via a slave turbine shaft 62 to generate electricity.

As used herein, the term "slave recirculated low oxygen content gas flow" refers to the gas flow generated by the burning of the slave combustible mixture in the slave turbine combustor 72 and flowing through a slave recirculation loop 92. In some embodiments, the term "low oxygen content" refers to an oxygen content of below about 5 vol %, below about 2 vol %, or below about 1 vol %.

In some embodiments, the gas turbine assembly may further comprise a slave secondary flow path 71 that may deliver at least a portion of the slave recirculated low oxygen content gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave recirculated low oxygen content gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to a slave recirculated gas flow cooler 80. In still other embodiments, the recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated low oxygen content gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, the exemplary power plant arrangement 300 may include a slave recirculated gas flow extraction unit 86 located downstream of the slave turbine compressor 70 and may be in fluid connection with at least a portion of the slave recirculated low oxygen content gas flow 90 via a slave turbine compressor output flow 84. In some embodiments, the slave recirculated gas flow extraction unit 86 may be fluidly connected to a slave gas separation system via a slave extraction conduit 88. In still other embodiments, the slave gas separation system may produce at least a first slave process stream of concentrated carbon dioxide and a second slave process stream of concentrated nitrogen, both with a low oxygen content. In some embodiments, the slave gas separation system may be, for instance, a slave carbon capture sequestration (CCS) system. In some embodiments, the slave recirculated gas flow extraction unit 86 may be attached to any point of the slave recirculation loop 92.

As illustrated in FIG. 13, in some embodiments, the slave turbine shaft 62 may be a "cold-end drive" configuration, meaning the slave turbine shaft 62 may connect to the slave turbine generator 60 at the compressor end of the turbine assembly. In other embodiments, the slave turbine shaft 62 may be a "hot-end drive" configuration, meaning the slave turbine shaft 62 may connect to the slave turbine generator 60 at the turbine end of the turbine assembly.

Similarly, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

Figure 14:
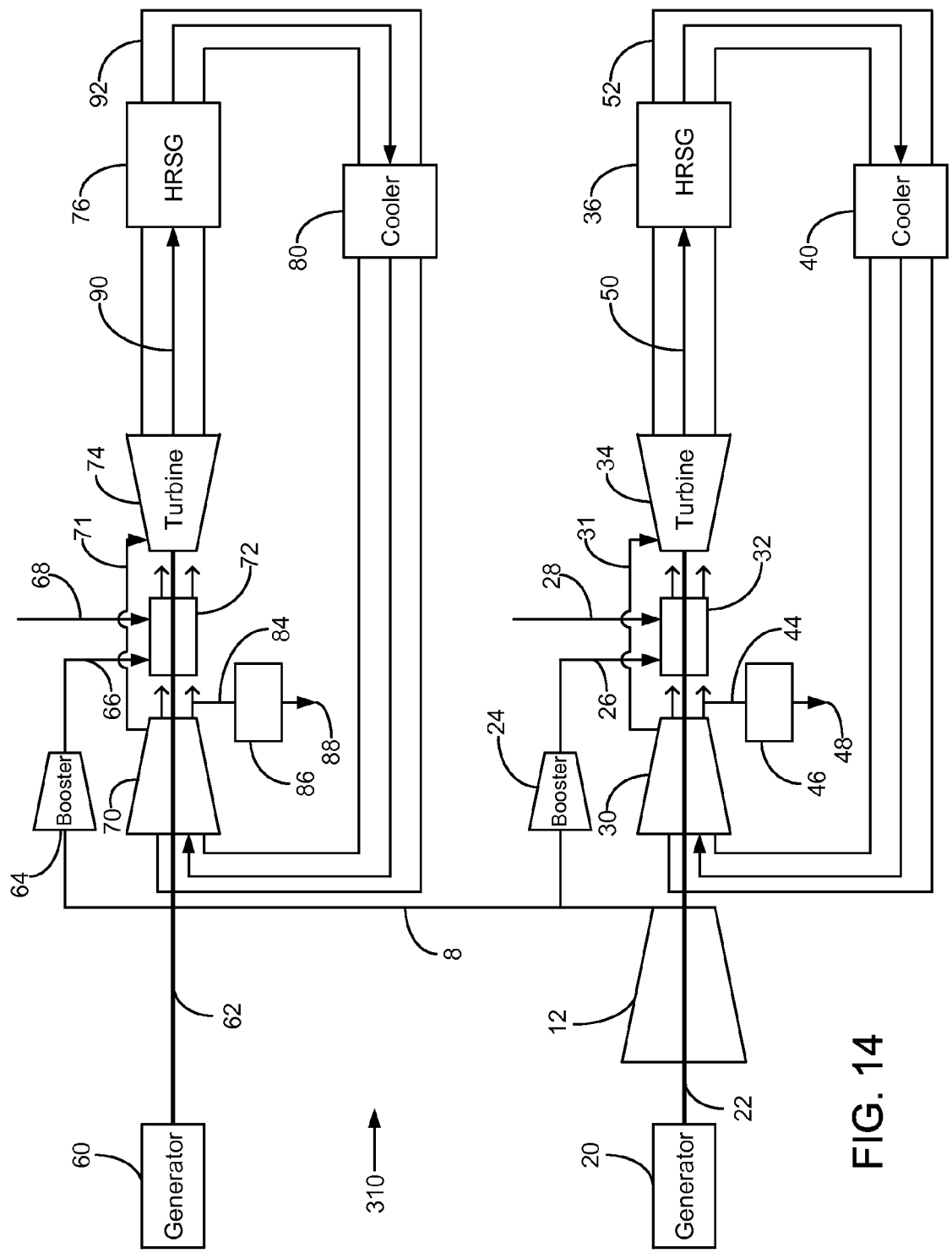
FIG. 14 is a diagrammatical illustration of another exemplary configuration 310 of the exemplary power plant arrangements of FIGS. 2 and 13 in accordance with an embodiment of the present invention.

FIG. 14 is a diagrammatical illustration of an exemplary configuration 310 of the exemplary power plant arrangement 300 of FIG. 13. As discussed with reference to FIGS. 2 and 13, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Similarly, in some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72.

Figure 15:
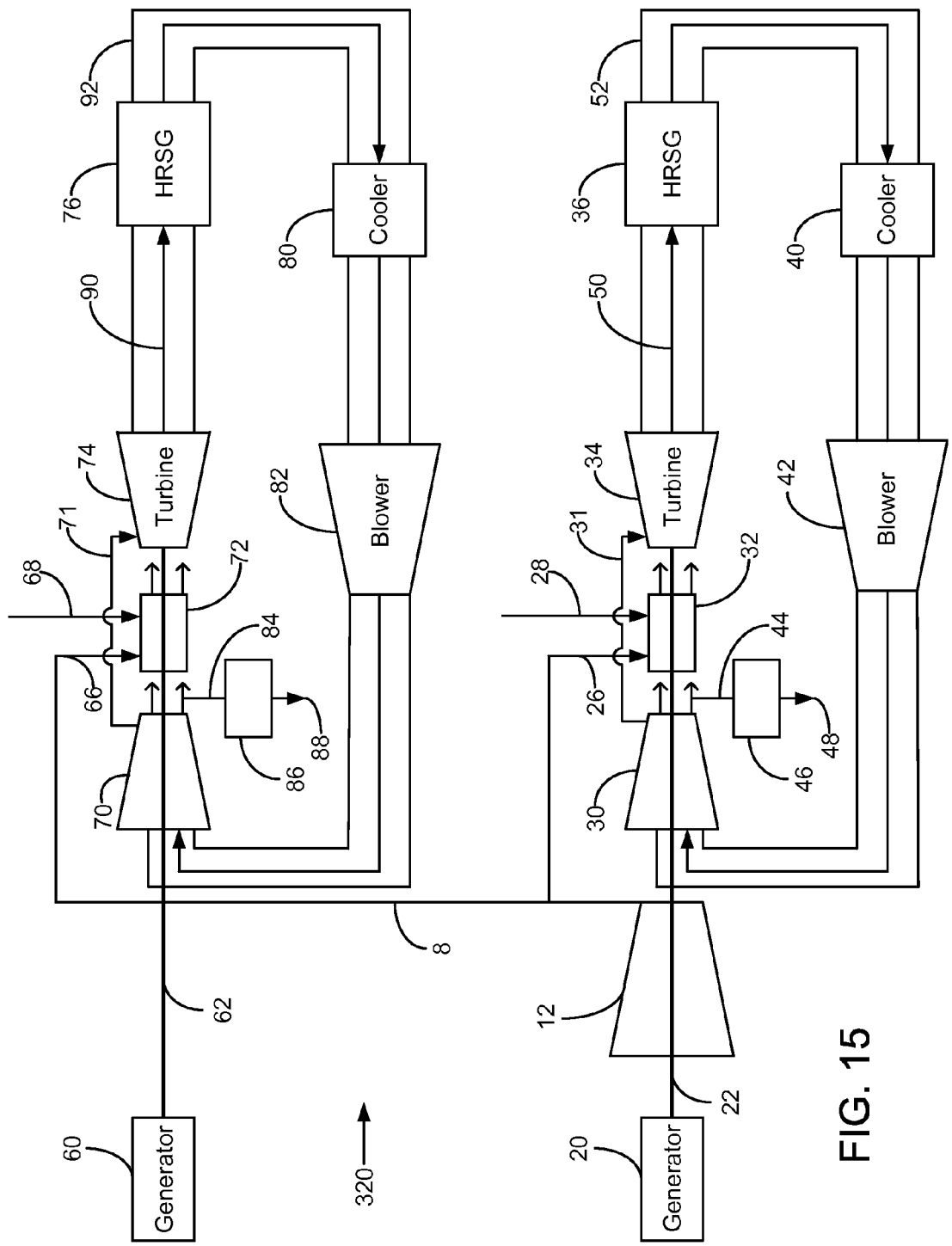
FIG. 15 is a diagrammatical illustration of another exemplary configuration 320 of the exemplary power plant arrangements of FIGS. 3 and 13 in accordance with an embodiment of the present invention.

FIG. 15 is a diagrammatical illustration of an exemplary configuration 320 of the exemplary power plant arrangement 300 of FIG. 13. As discussed with reference to FIGS. 3 and 13, in some embodiments, a blower 42 may be fluidly connected to the recirculation loop 52 downstream from the recirculated gas flow cooler 40. The blower 42 may be configured to increase the pressure of the recirculated low oxygen content gas flow 50 prior to delivery into the turbine compressor 30 via the recirculation loop 52. Similarly, in some embodiments, a slave blower 82 may be fluidly connected to the slave recirculation loop 92 downstream of the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

Figure 16:
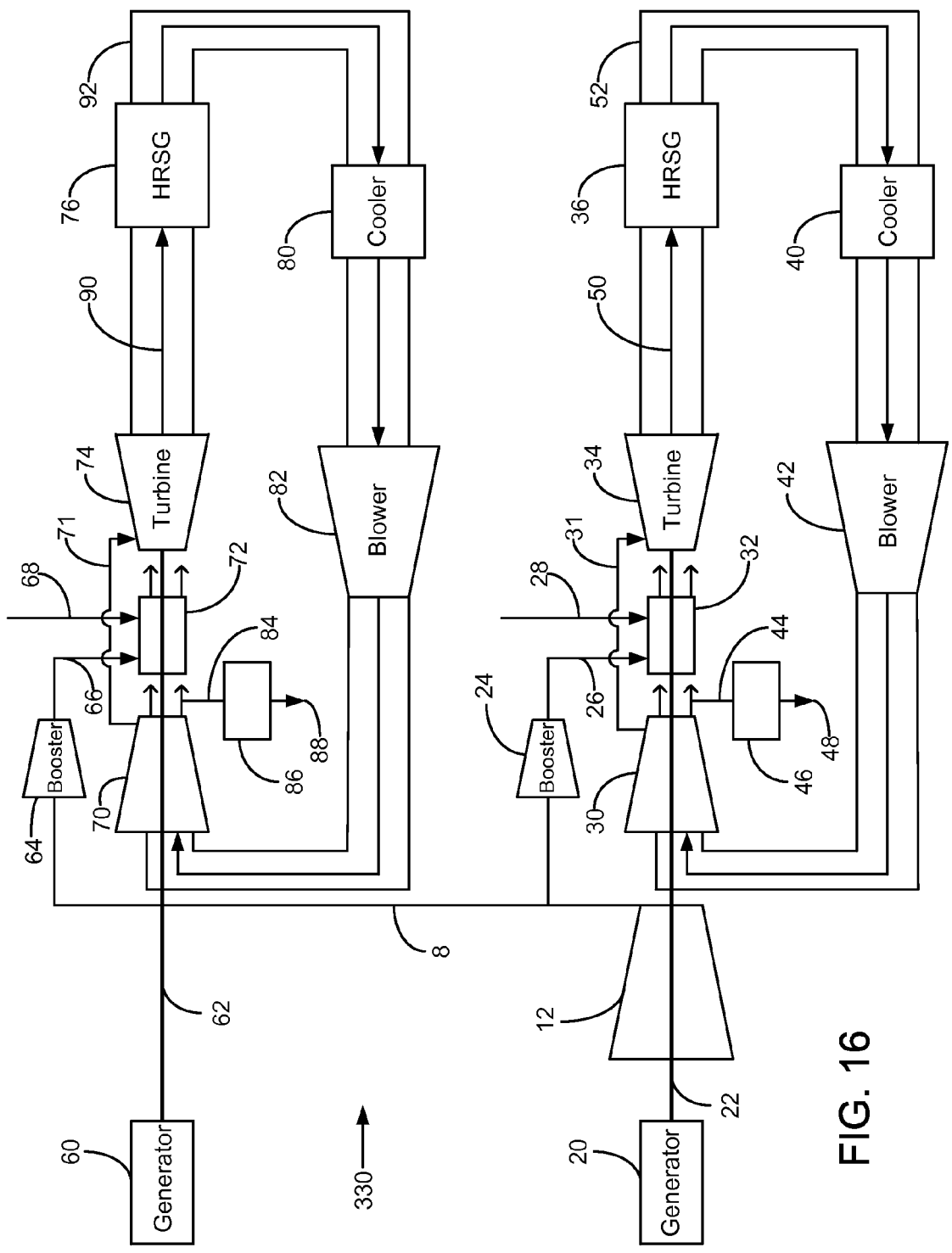
FIG. 16 is a diagrammatical illustration of another exemplary configuration 330 of the exemplary power plant arrangements of FIGS. 4 and 13 in accordance with an embodiment of the present invention.

FIG. 16 is a diagrammatical illustration of an exemplary configuration 330 of the exemplary power plant arrangement 300 of FIG. 13. As discussed with reference to FIGS. 4 and 13, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

Similarly, in some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. Further, in some embodiments, a slave blower 82 may be fluidly connected to the slave recirculation loop 92 downstream of the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

Figure 17:
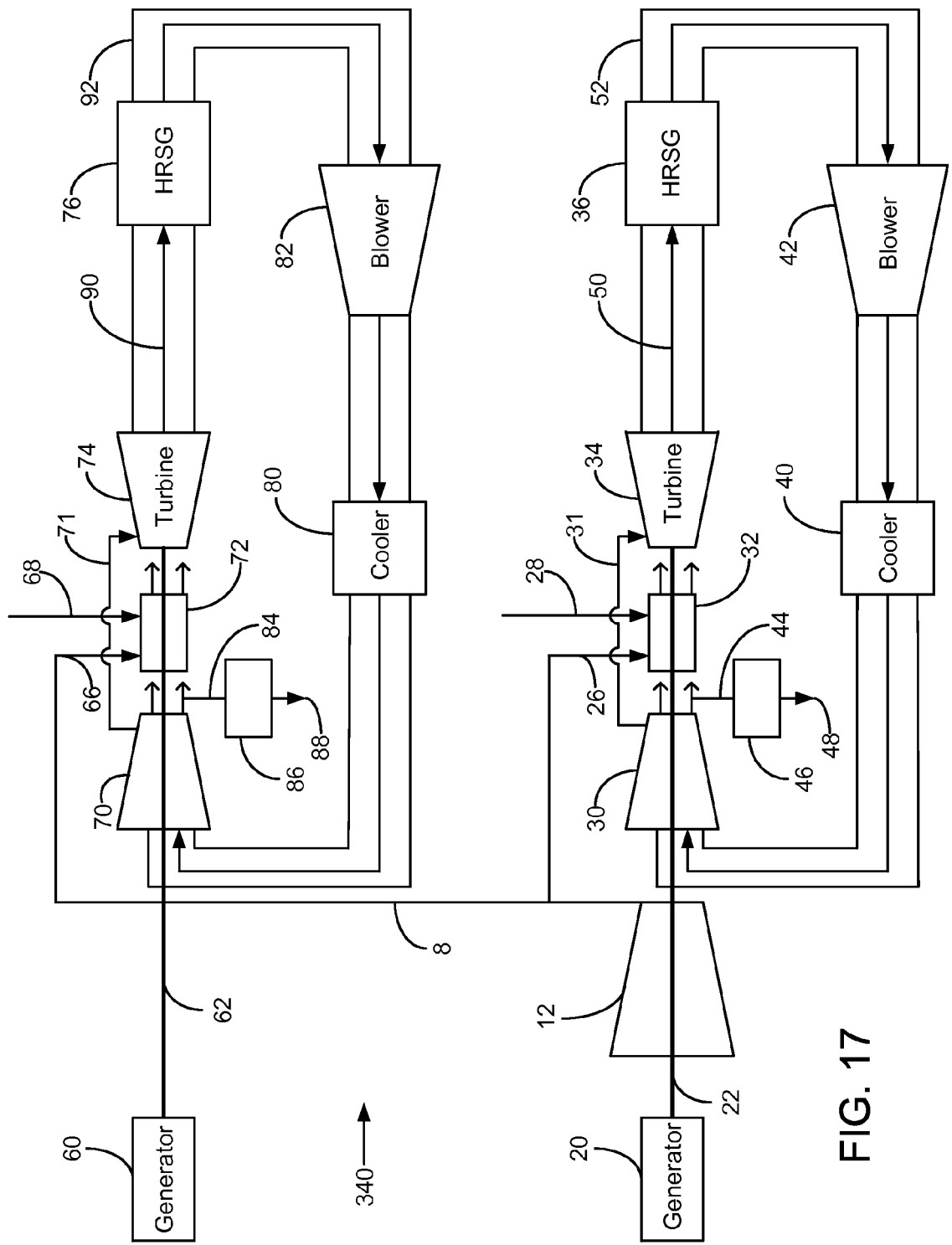
FIG. 17 is a diagrammatical illustration of another exemplary configuration 340 of the exemplary power plant arrangements of FIGS. 5 and 13 in accordance with an embodiment of the present invention.

FIG. 17 is a diagrammatical illustration of an exemplary configuration 340 of the exemplary power plant arrangement 300 of FIG. 13. As discussed with reference to FIGS. 5 and 13, in some embodiments, a blower 42 may be fluidly connected to the recirculation loop 52 upstream of the recirculated gas flow cooler 40. The blower 42 may be configured to increase the pressure of the recirculated low oxygen content gas flow 50 prior to delivery into the recirculated gas flow cooler 40 via the recirculation loop 52. Similarly, in some embodiments, a slave blower 82 may be fluidly connected to the slave recirculation loop 92 upstream of the slave recirculated gas flow cooler 80. The slave blower 82 may be configured to increase the pressure of the slave recirculated low oxygen content gas flow 90 prior to delivery into the slave recirculated gas flow cooler 80 via the slave recirculation loop 92.

Figure 18:
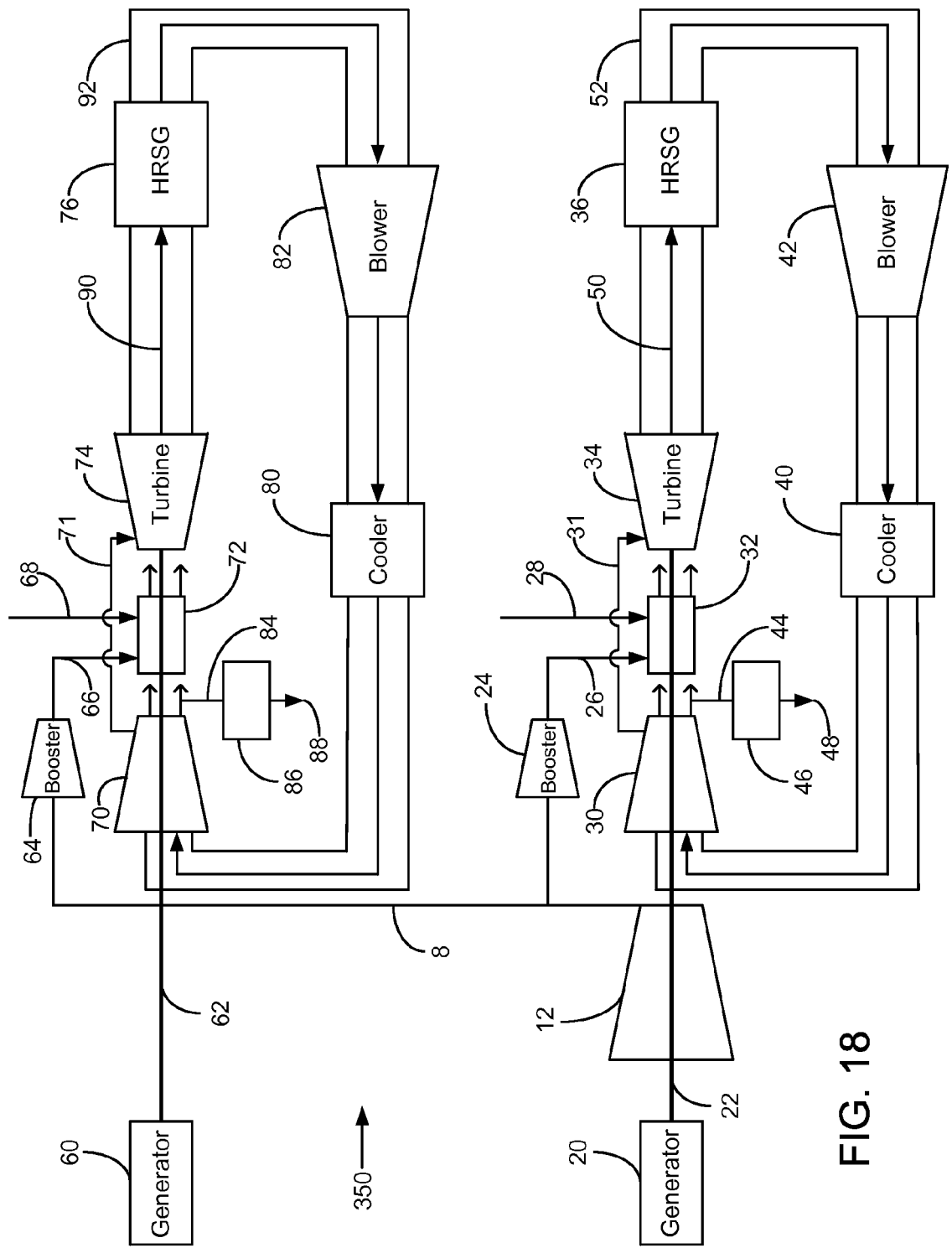
FIG. 18 is a diagrammatical illustration of another exemplary configuration 350 of the exemplary power plant arrangements of FIGS. 6 and 13 in accordance with an embodiment of the present invention.

FIG. 18 is a diagrammatical illustration of an exemplary configuration 350 of the exemplary power plant arrangement 300 of FIG. 13. As discussed with reference to FIGS. 6 and 13, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 upstream of the recirculated gas flow cooler 40. The blower 42 may be configured to increase the pressure of the recirculated low oxygen content gas flow 50 prior to delivery into the recirculated gas flow cooler 40 via the recirculation loop 52.

Similarly, in some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. Further, in some embodiments, a slave blower 82 may be fluidly connected to the slave recirculation loop 92 upstream of the slave recirculated gas flow cooler 80. The slave blower 82 may be configured to increase the pressure of the slave recirculated low oxygen content gas flow 90 prior to delivery into the slave recirculated gas flow cooler 80 via the slave recirculation loop 92.

Figure 19:
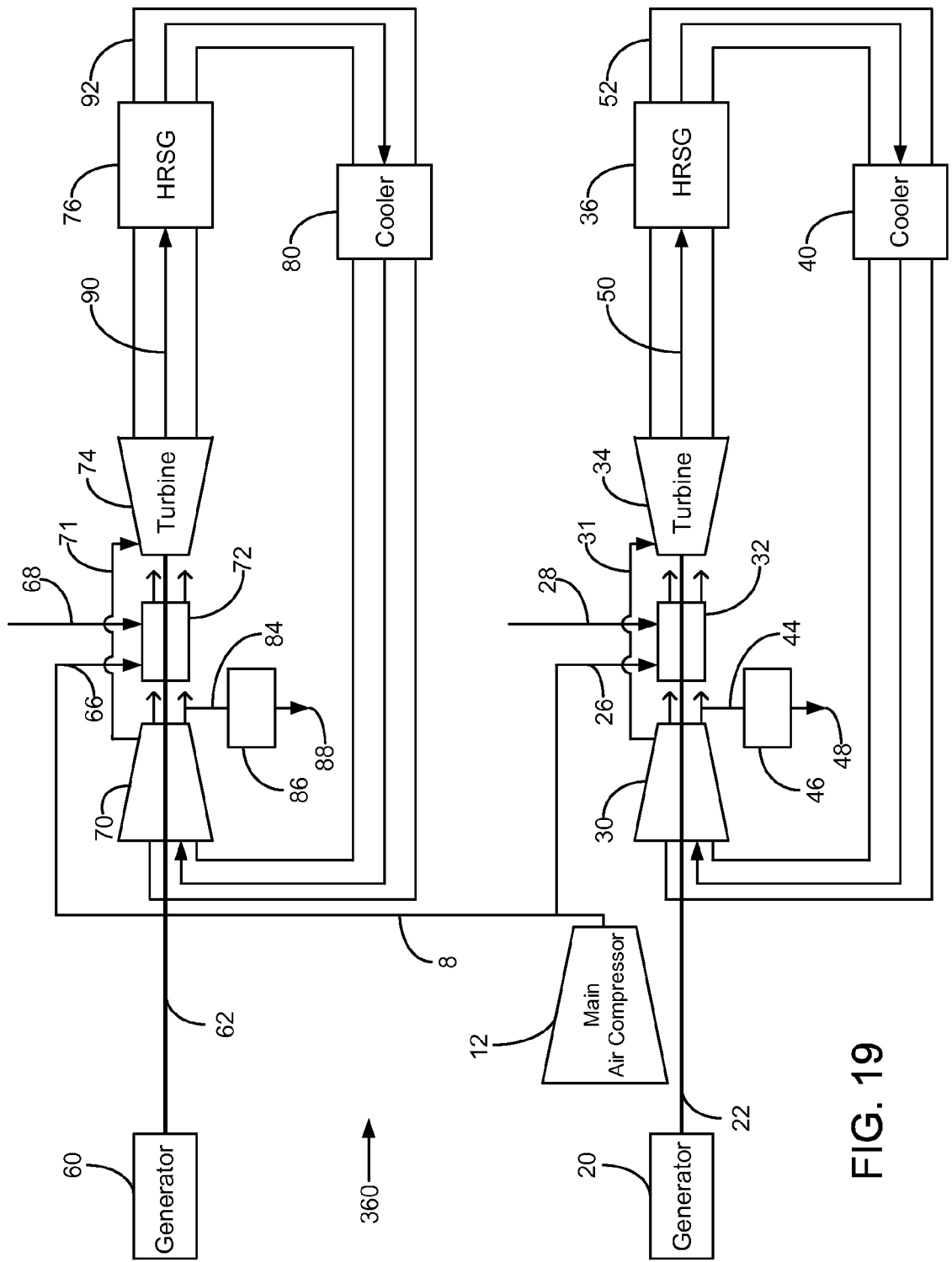
FIG. 19 is a diagrammatical illustration of another exemplary configuration 360 of the exemplary power plant arrangements of FIGS. 7 and 13 in accordance with an embodiment of the present invention.

FIG. 19 is a diagrammatical illustration of an exemplary configuration 360 of the exemplary power plant arrangement 300 of FIG. 13. As discussed with reference to FIGS. 7 and 13, in some embodiments, the main air compressor 12 may not be driven by the power generated by the turbine 34 via the turbine shaft 22. Furthermore, in some embodiments, the main air compressor 12 may not be connected to the turbine shaft 22.

Figure 20:
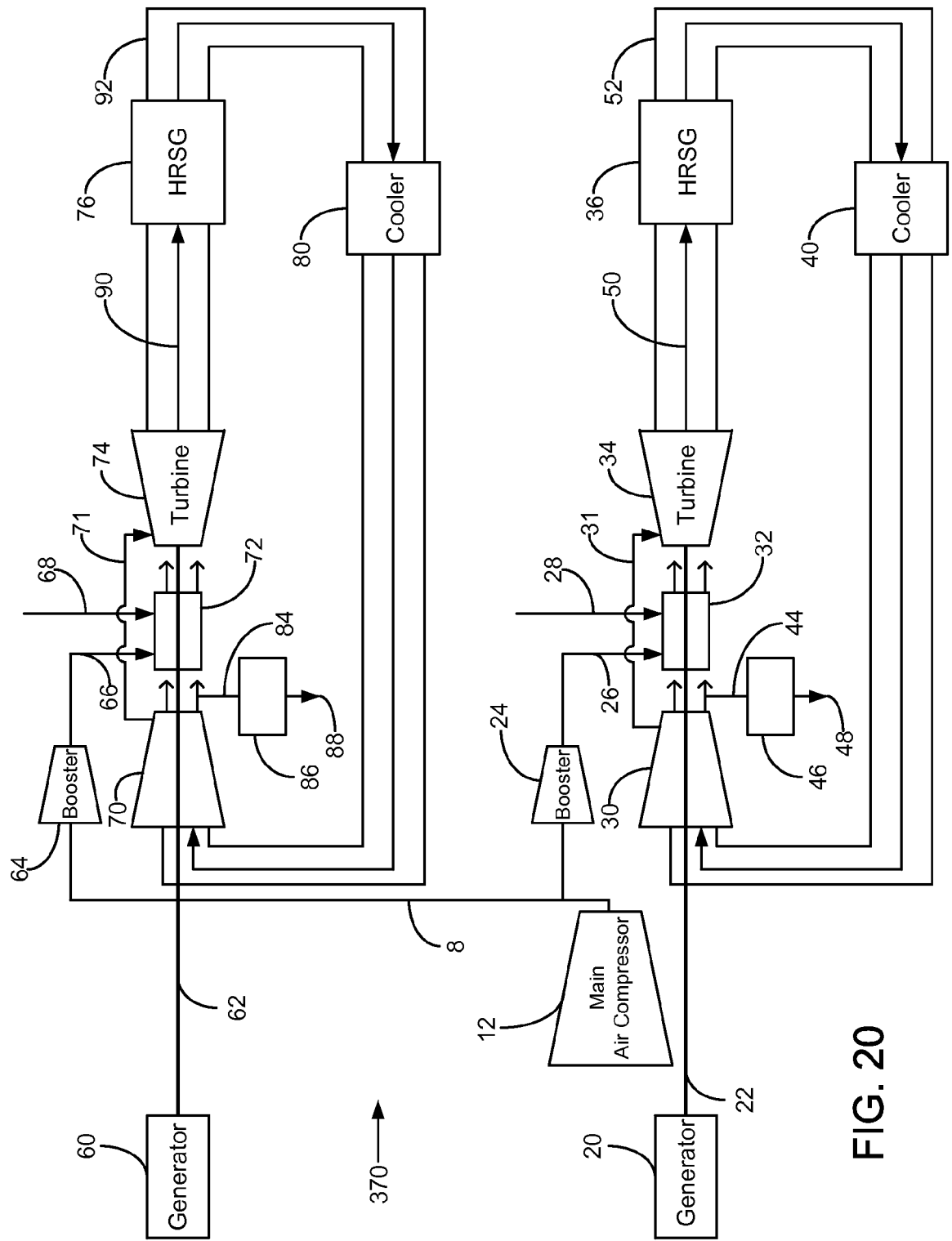
FIG. 20 is a diagrammatical illustration of another exemplary configuration 370 of the exemplary power plant arrangements of FIGS. 8 and 13 in accordance with an embodiment of the present invention.

FIG. 20 is a diagrammatical illustration of an exemplary configuration 370 of the exemplary power plant arrangement 300 of FIG. 14. As discussed with reference to FIGS. 8 and 13, in some embodiments, the main air compressor 12 may not driven by the power generated by the turbine 34 via the turbine shaft 22. Furthermore, in some embodiments, the main air compressor 12 may not be connected to the turbine shaft 22. Additionally, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Similarly, in some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72.

Figure 21:
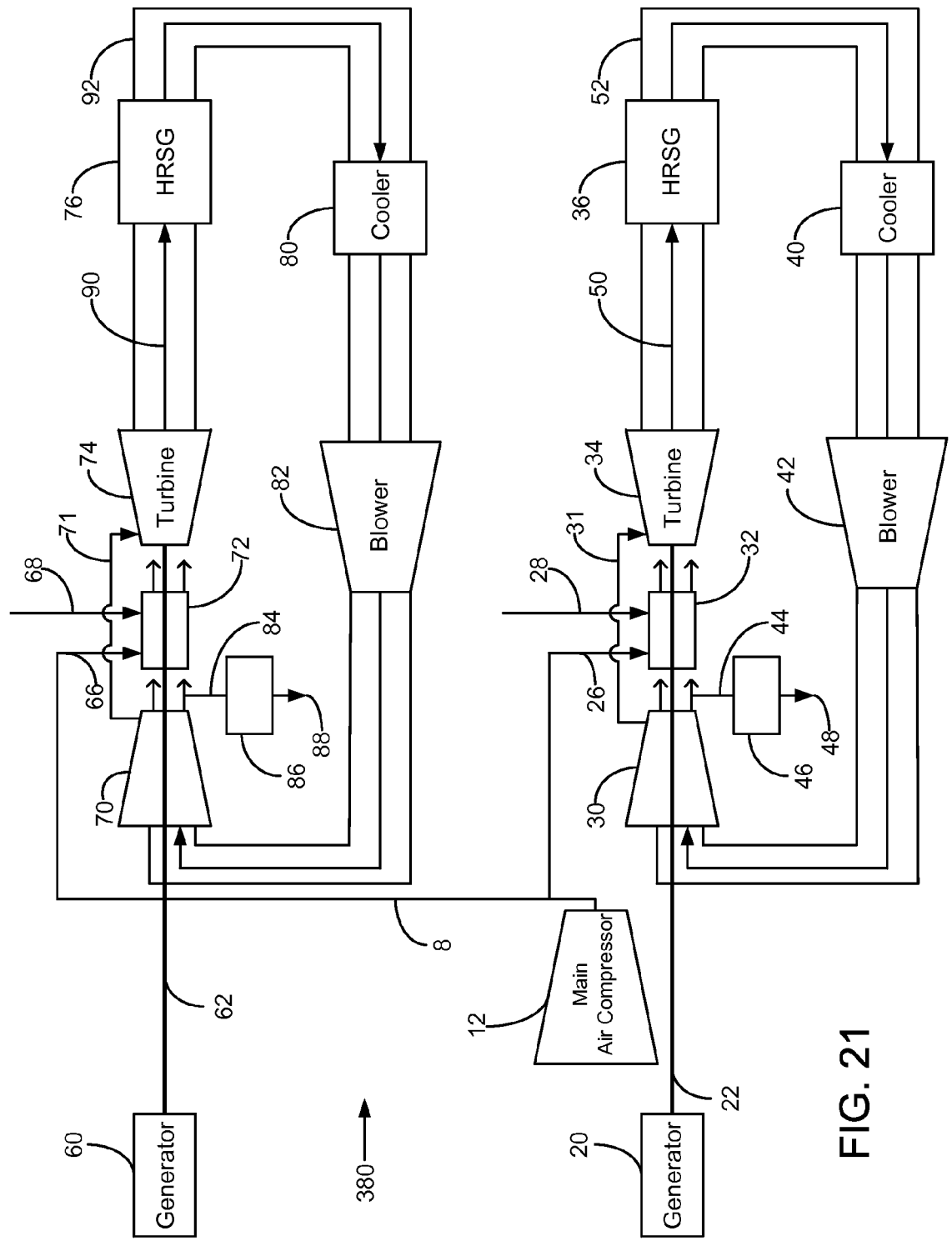
FIG. 21 is a diagrammatical illustration of another exemplary configuration 380 of the exemplary power plant arrangements of FIGS. 9 and 13 in accordance with an embodiment of the present invention.

FIG. 21 is a diagrammatical illustration of an exemplary configuration 380 of the exemplary power plant arrangement 300 of FIG. 14. As discussed with reference to FIGS. 9 and 13, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

Similarly, in some embodiments, a slave blower 82 may be fluidly connected to the slave recirculation loop 92 downstream of the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

Figure 22:
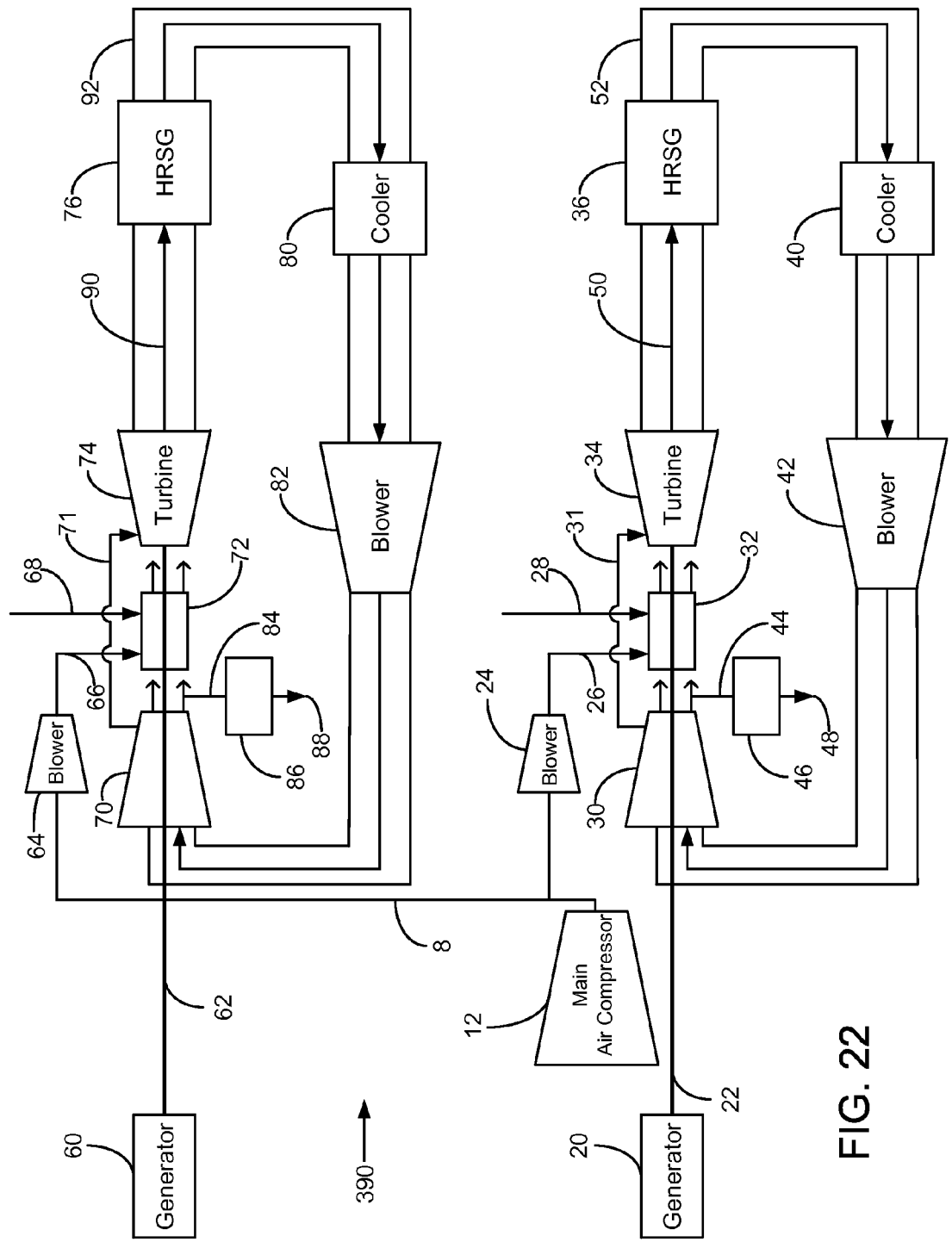
FIG. 22 is a diagrammatical illustration of another exemplary configuration 390 of the exemplary power plant arrangements of FIGS. 10 and 13 in accordance with an embodiment of the present invention.

FIG. 22 is a diagrammatical illustration of an exemplary configuration 390 of the exemplary power plant arrangement 300 of FIG. 14. As discussed with reference to FIGS. 10 and 13, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 downstream of the recirculated gas flow cooler 40. The blower 42 may be configured to increase the pressure of the recirculated low oxygen content gas flow 50 prior to delivery into the turbine compressor 30 via the recirculation loop 52.

Similarly, in some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. Further, in some embodiments, a slave blower 82 may be fluidly connected to the slave recirculation loop 92 downstream of the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

Figure 23:
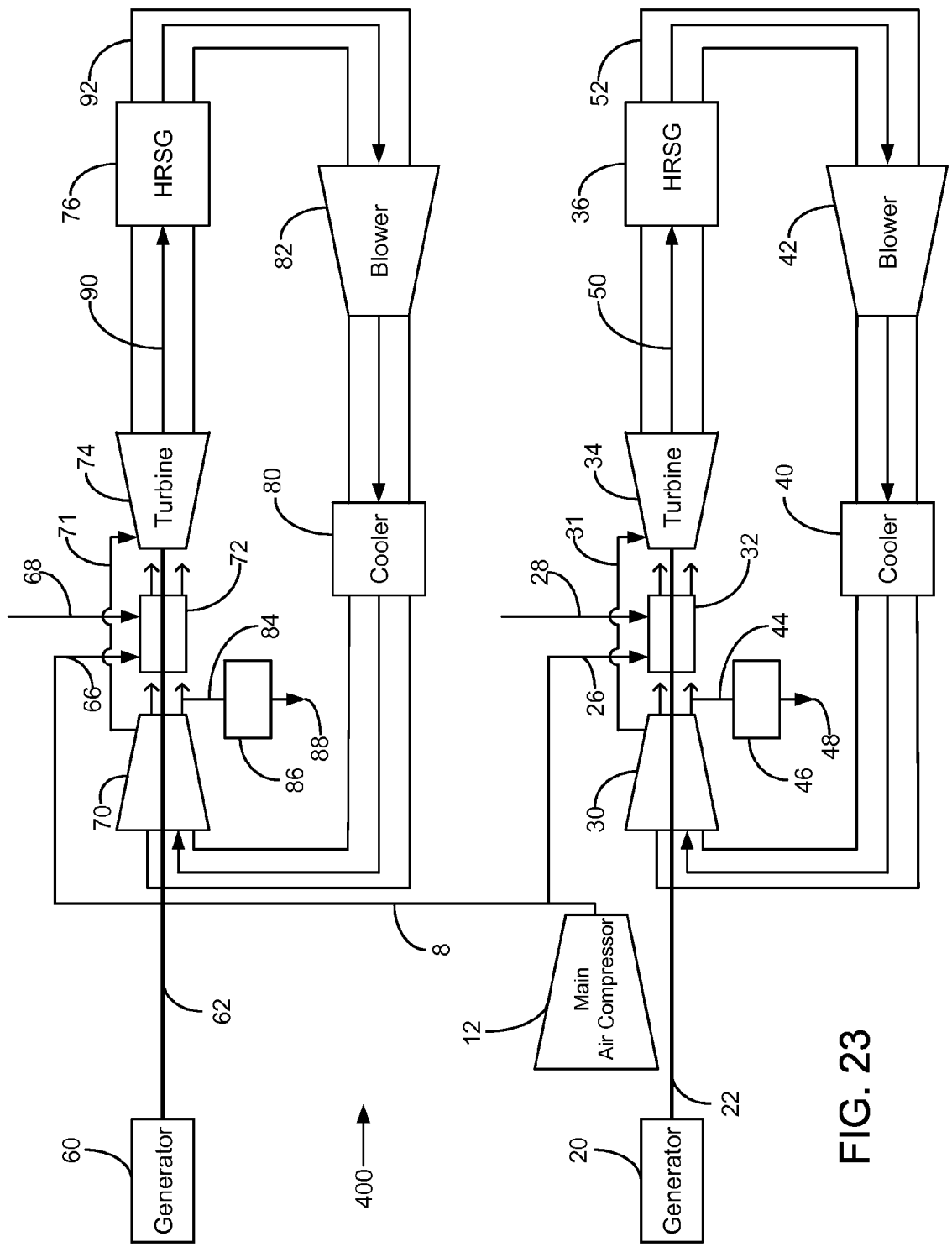
FIG. 23 is a diagrammatical illustration of another exemplary configuration 400 of the exemplary power plant arrangements of FIGS. 11 and 13 in accordance with an embodiment of the present invention.

FIG. 23 is a diagrammatical illustration of an exemplary configuration 400 of the exemplary power plant arrangement 300 of FIG. 13. As discussed with reference to FIGS. 11 and 13, in some embodiments, the main air compressor 12 may not be driven by the power generated by the turbine 34 via the turbine shaft 22. Furthermore, in some embodiments, the main air compressor 12 may not be connected to the turbine shaft 22. Additionally, in some embodiments, a blower 42 may be fluidly connected to the recirculation loop 52 upstream from the recirculated gas flow cooler 40. The blower 42 may be configured to increase the pressure of the recirculated low oxygen content gas flow 50 prior to delivery into the recirculated gas flow cooler 40 via the recirculation loop 52.

Similarly, in some embodiments, a slave blower 82 may be fluidly connected to the slave recirculation loop 92 upstream of the slave recirculated gas flow cooler 80. The slave blower 82 may be configured to increase the pressure of the slave recirculated low oxygen content gas flow 90 prior to delivery into the slave recirculated gas flow cooler 80 via the slave recirculation loop 92.

Figure 24:
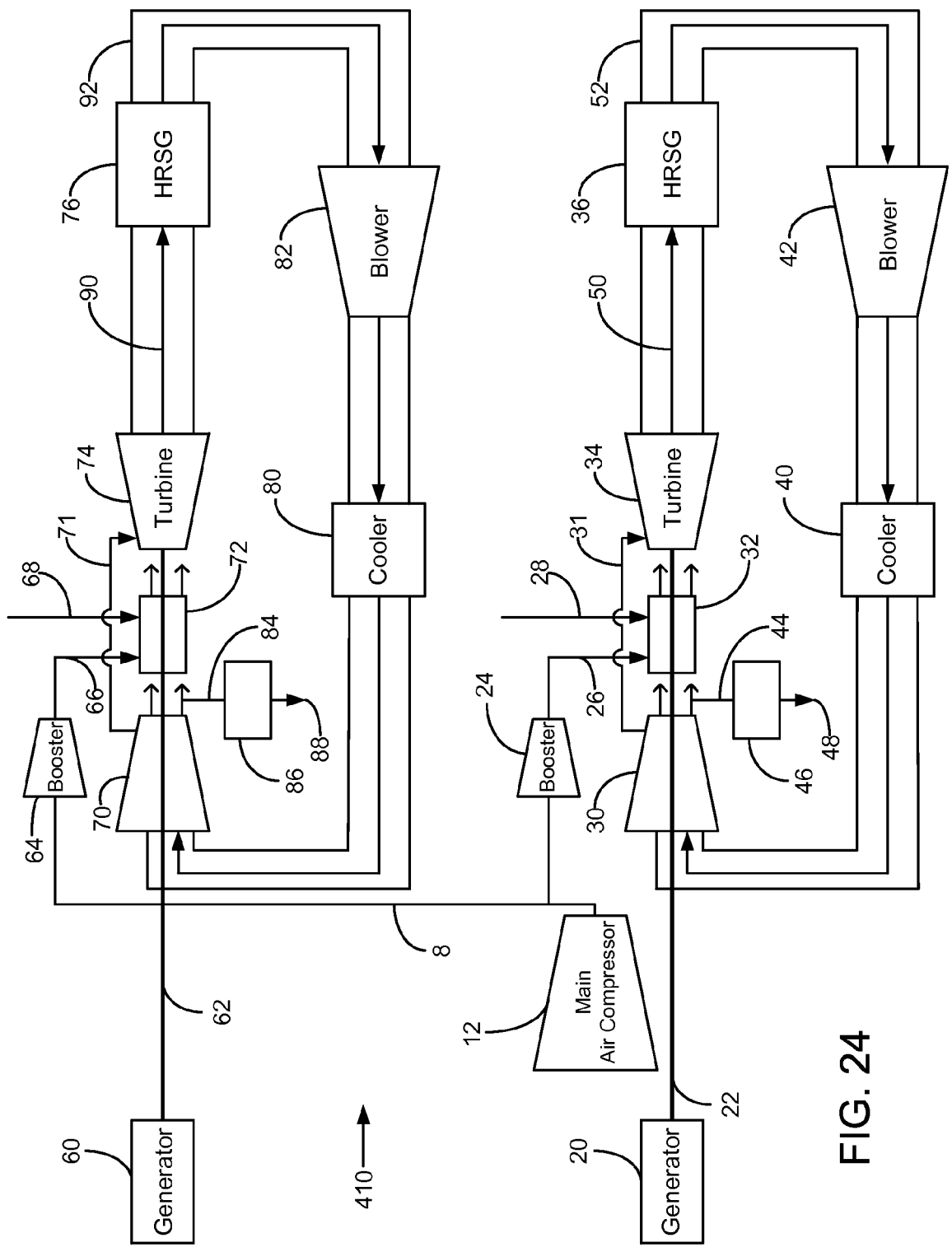
FIG. 24 is a diagrammatical illustration of another exemplary configuration 410 of the exemplary power plant arrangements of FIGS. 12 and 13 in accordance with an embodiment of the present invention.

FIG. 24 is a diagrammatical illustration of an exemplary configuration 410 of the exemplary power plant arrangement 300 of FIG. 13. As discussed with reference to FIGS. 12 and 13, in some embodiments, the main air compressor 12 may not be driven by the power generated by the turbine 34 via the turbine shaft 22. Furthermore, in some embodiments, the main air compressor 12 may not connected to the turbine shaft 22. Additionally, in some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. Further, in some embodiments, a blower 42 may be fluidly connected to the recirculation loop 52 upstream of the recirculated gas flow cooler 40. The blower 42 may be configured to increase the pressure of the recirculated low oxygen content gas flow 50 prior to delivery into the recirculated gas flow cooler 40 via the recirculation loop 52.

Similarly, in some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. Further, in some embodiments, a slave blower 82 may be fluidly connected to the slave recirculation loop 92 upstream of the slave recirculated gas flow cooler 80. The slave blower 82 may be configured to increase the pressure of the slave recirculated low oxygen content gas flow 90 prior to delivery into the slave recirculated gas flow cooler 80 via the slave recirculation loop 92.

In some embodiments, the power plant arrangement may comprise one gas turbine assembly. In other embodiments, the power plant arrangement may comprise two or more gas turbine assemblies that are fluidly connected by the inter-train conduit 8. As used herein, the term "inter-train conduit" may refer to any fluid connection between two or more gas turbine assemblies and one or more main air compressors. In still other embodiments, the power plant arrangement may comprise three or more gas turbine assemblies and one or more additional main air compressors, wherein the additional main air compressors are in fluid connection with each other and with the gas turbine assemblies. In yet other embodiments, the power plant arrangement may be configured for substantially stoichiometric combustion. In still other embodiments, the power plant arrangement may be configured for substantially zero emissions power production.

In some embodiments, the fuel stream 28 and/or the slave fuel stream 68 may comprise an organic gas, including but not limited to methane, propane, and/or butane. In still other embodiments, the fuel stream 28 and/or the slave fuel stream 68 may comprise an organic liquid, including but not limited to methanol and/or ethanol. In yet other embodiments, the fuel stream 28 and/or the slave fuel stream 68 may comprise a fuel source obtained from a solid carbonaceous material such as coal.

Start-Up Method for a Master Train and a Slave Train

As used herein, the term "master train" refers to any gas turbine assembly that also includes a main air compressor. As used herein, the term "slave train" refers to any gas turbine assembly that does not also include a main air compressor. Thus, any given slave train requires at least one master train for operation. In some embodiments, a power plant arrangement may comprise only a master train. In such a situation, the master train may be started using the protocol described below for master train start-up.

Master Train Start-Up

Figure 25:
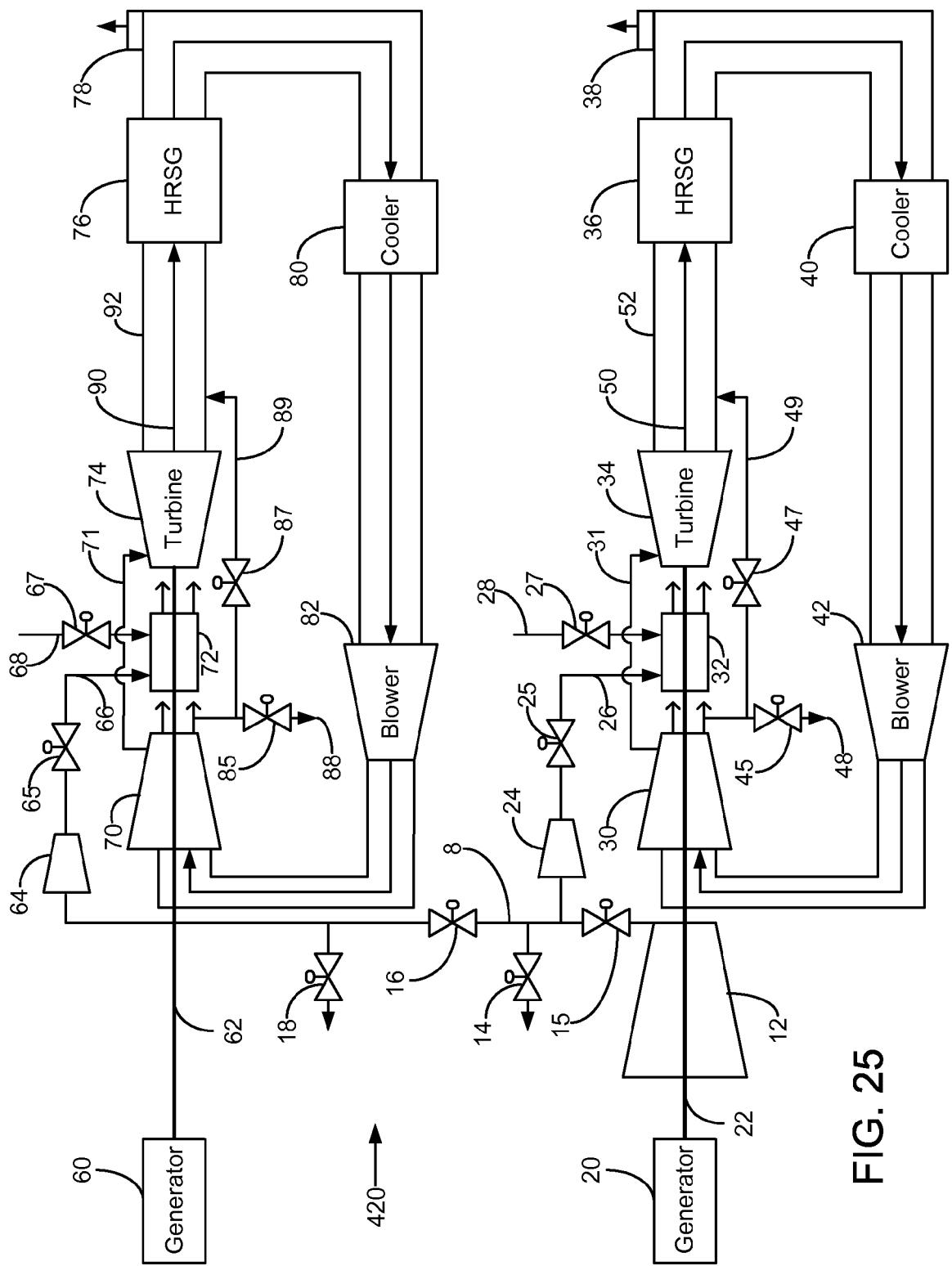
FIG. 25 is a diagrammatical illustration of an exemplary power plant arrangement 420 in accordance with embodiments of the present invention.

As illustrated in FIG. 25, a method for starting-up the master train of a stoichiometric exhaust gas recirculation power plant arrangement 420 is provided. Ambient air may be compressed into a compressed ambient gas flow using a main air compressor 12. An air injection valve 15 may be opened to allow the delivery of the compressed ambient gas flow into an inter-train conduit 8. A master air injection valve 25, fluidly connecting the inter-train conduit 8 to a master turbine combustor 32, may also be opened. At least a first portion of the compressed ambient gas flow 26, having a compressed ambient gas flow rate, may be delivered to a master turbine combustor 32 that is fluidly connected to the main air compressor 12.

In some embodiments, a master turbine bypass valve 47 connected to a master bypass conduit 49 may be opened. The master bypass conduit 49 may be fluidly connected to an output of a master turbine compressor 30 and may be configured to deliver a master bypass flow to a master recirculation loop 52 at a location that is downstream of a master turbine 34. Additionally, a master exhaust port, such as a master damper door 38, that may be fluidly connected to the master recirculation loop 52 may be opened such that the master recirculation loop 52 may be vented to the atmosphere. In some embodiments, the master exhaust port may be fluidly connected to the master recirculation loop 52. In other embodiments, the master exhaust port may be fluidly connected to the master bypass conduit 49. In still other embodiments, the master exhaust port may be fluidly connected to the master extraction conduit 48. In embodiments, the master exhaust port may vent the master train to the atmosphere. In other embodiments, the master exhaust port may not vent the master train to the atmosphere.

Purging the Master Train

In some embodiments, the master train of the exemplary power plant arrangement 420 may be purged just before ignition in order to vent any combustibles that may have accumulated in the master train prior to ignition. The master extraction valve 45 and the master gas control valve 27 must be closed, while the master air injection valve 25 must be opened for purge. In some embodiments, a master turbine shaft 22 connected to the master turbine 34 and to the master turbine compressor 30 may be rotated at a purge speed. The rotation of the master turbine shaft 22 might be accomplished with, for instance, a master turbine generator 20 or a starting motor. In some embodiments, the master turbine generator 20 may be equipped with a load-commutated inverter to supply rotational power to the master turbine shaft 22. In some embodiments, the master turbine shaft 22 may be operated at a purge speed, which may be in the range of about 20% to about 30% of the maximum turbine rotation speed. In other embodiments, the purge speed may be in the range of about 22% to about 28% of the maximum turbine rotation speed. In still other embodiments, the purge speed may be about 25% of the maximum turbine rotation speed. The exemplary power plant arrangement 420 may be operated under purge conditions until all volatile combustibles have been vented from the master train.

During the purge step, the inlet guide vanes of the main air compressor 12 may be adjusted to control the master purge air flow. Additionally, during the purge step the variable bleed valve 14 may be used to vent any additional air pressure generated by the main air compressor 12, as necessary, to prevent over-pressurization of the master gas turbine assembly.

In some embodiments, the step of purging may include the use of the master booster compressor 24 which may be incorporated downstream of and in fluid connection with the main air compressor 12 and upstream of and in fluid connection with the master turbine combustor 32. The master booster compressor 24 may further compress the at least a first portion of the compressed ambient gas flow 26 before delivery into the master turbine combustor 32. The exhaust of the master booster combustor 24 may be delivered to the master turbine combustor 32. In some embodiments, the exhaust of the master booster compressor 24 may be regulated by the master air injection valve 25. In some embodiments, the step of purging may include the use of the master turbine blower 42 that is located in the master recirculation loop 52.

In still other embodiments, the purge step is not necessary. In such embodiments, the master train of the exemplary power plant arrangement 420 has already been purged, for instance during a previous shutdown.

Ignition of the Master Train

The next step is ignition of the master train in the exemplary power plant arrangement 420. The master turbine shaft 22 connected to the master turbine 34 and to the master turbine compressor 30 may be rotated at the purge speed or at an ignition speed. The rotation of the master turbine shaft 22 might be accomplished with, for instance, a master turbine generator 20 or a starting motor. In some embodiments, the master turbine generator 20 may be equipped with a load-commutated inverter to supply rotational power to the master turbine shaft 22. In some embodiments, the ignition speed may be in the range of about 10% to about 20% of the maximum turbine rotation speed. In other embodiments, the ignition speed may be in the range of about 12% to about 16% of the maximum turbine rotation speed. In still other embodiments, the ignition speed may be about 14% of the maximum turbine rotation speed.

A master fuel stream 28, having a master fuel stream flow rate, may be delivered to the master turbine combustor 32 for mixing with the at least a first portion of the compressed ambient gas flow 26 to form a master combustible mixture. Spark plugs in the master turbine combustor 32 may be ignited and the master combustible mixture may be burned in the master turbine combustor 32 and thereby form the master recirculated gas flow 50 and drive the master turbine 34 connected to the master turbine compressor 30 via the master turbine shaft 22. As used herein, the term "driving" means that both the master turbine 34 and the master turbine compressor 30 rotate. In some embodiments, the master booster compressor 24 may be adjusted during ignition as necessary.

The master recirculated gas flow 50 may then be recirculated from the master turbine 34 to the master turbine compressor 30 using the master recirculation loop 52. The master recirculation loop 52 may fluidly connect an output of the master turbine 34 with an input of the master turbine compressor 30. The master recirculated gas flow 50 may further pass through the master heat recovery steam generator 36, the master recirculated gas flow cooler 40, and the master turbine blower 42 en route from the output of the master turbine 34 to the input of master turbine compressor 30.

In some embodiments, the master train may further comprise a master secondary flow path 31 that may deliver at least a portion of the master recirculated gas flow 50 from the master turbine compressor 30 to the master turbine 34 as a master secondary flow. The master secondary flow may be used to cool and to seal the master turbine 34, including individual components of the master turbine 34 such as the turbine shroud, the turbine nozzle, the turbine blade tip, the turbine bearing support housing, and the like. After cooling and sealing the master turbine 34 and any individual master turbine components, the master secondary flow may be directed into the master recirculation loop 52 near the output of the master turbine 34. The master secondary flow path 31 may be used throughout the entire start-up method.

Operating the Master Train at a Master Target Operating Speed

The next step is operating the master turbine 34 at a master target operating speed. In some embodiments, when the master turbine 34 is connected to an electrical grid, the master target operating speed may be about 3000 rpm for a 50 Hz grid or about 3600 rpm for a 60 Hz grid. In other embodiments, when the master turbine 34 is not connected to an electrical grid, the master target operating speed may match the required speed of auxiliary apparatus for which the master turbine 34 is driving.

In some embodiments, the master turbine 34 may be operating at a master target operating speed after ignition. In other embodiments, the master turbine 34 may need to be accelerated to a master target operating speed after ignition. In some embodiments, the master turbine 34 may be accelerated to a master target operating speed by adjusting the master fuel stream flow rate and the master compressed ambient gas flow rate.

In embodiments where the master turbine generator 20 is equipped with a load-commutated inverter to supply rotational power to the master turbine shaft 22 during a purge step, the load-commutated inverter may be used to accelerate the master turbine shaft 22 until the burning of the master combustible mixture provides a master turbine power that is enough to sustain the power needs of the master turbine compressor 30 and/or the main air compressor 12. In some embodiments, the inverter may be disengaged before or during acceleration of the master turbine 34. The master turbine 34 may be driven by the master recirculated gas flow 50 generated by combustion in the master turbine combustor 32. In some embodiments, the step of acceleration may comprise adjusting the master fuel stream flow rate by adjusting the master gas control valve 27. In some embodiments, the step of acceleration may comprise adjusting the inlet guide vanes of the main air compressor 12. In some embodiments, the step of acceleration may comprise adjusting the master booster compressor 24. In some embodiments, the master variable bleed valve 14 may be closed to facilitate acceleration.

In embodiments, the master recirculated gas flow 50 expands in the master turbine 34, thereby causing the master turbine 34 to rotate. As used herein, the term "driven using the master recirculated gas flow" means the master recirculated gas flow 50 expands upon exit from the master turbine combustor 32 and upon entrance into the master turbine 34, thereby causing the master turbine 34 to rotate. In this embodiment, rotation of the master turbine 34 causes the master turbine shaft 22 and the master turbine compressor 30 to also rotate.

Synchronizing the Master Train to the Grid and Loading

The next step may be synchronizing the master train to the power grid. In operation, the master turbine generator 20 may be synchronized to a power grid and the master turbine generator 20 may then be electrically connected to the power grid. As used herein, "synchronized to a power grid" means synchronizing the three phases of the alternating current of the master turbine generator 20 to the three phases of the alternating current of the power grid.

The master turbine shaft 22 may be connected to the master turbine generator 20, such that rotation of the master turbine shaft 22 may cause the master turbine generator 20 to generate electricity once the master turbine generator circuit breaker is closed. In some embodiments, a master circuit breaker connecting the master turbine generator 20 to the power grid may be closed once the master turbine generator 20 is synchronized to the power grid.

In some embodiments, the master train may then be loaded to a desired load point. As used herein, the term "loaded" means that the rotation of the master turbine shaft 22 in the master turbine generator 20 is converted from mechanical energy to electrical energy, wherein the electrical energy is transferred to the power grid.

In other embodiments, the turbine shaft 22 may not be connected to a turbine generator 20. In some embodiments, the turbine shaft 22 may instead be used as a mechanical drive for auxiliary apparatus.

During loading, the master fuel stream flow rate and the master compressed ambient gas flow rate may be adjusted as necessary. In some embodiments, the master booster compressor 24 may be adjusted during loading as necessary.

In some embodiments, the master recirculated gas flow 50 may be directed through the master heat recovery steam generator 36 for the generation of steam. A master steam turbine may be further configured to generate additional electricity using the steam from the master heat recovery steam generator 36, and the master steam turbine may be connected to a master steam generator. In some embodiments, the master heat recovery steam generator 36, in conjunction with the master steam turbine and the master steam generator, may be configured to generate additional electricity when the temperature of the master recirculated gas flow 50 is in the range from about 200° C. to about 700° C., from about 260° C. to about 600° C., or from about 300° C. to about 550° C. In some embodiments, the master steam turbine may be connected to the master turbine shaft 22.

Master Train Stoichiometric Combustion

The next step may be reaching substantially stoichiometric combustion in the master train. The step of reaching substantially stoichiometric combustion may also be performed prior to loading. The step comprises adjusting the master fuel stream flow rate and the master compressed ambient gas flow rate to reach substantial combustion stoichiometry. As used herein, the term "substantial combustion stoichiometry" means that the oxygen content after the combustion reaction may be below about 5 vol %, below about 2 vol %, or below about 1 vol %. In operation, the master fuel stream flow rate of the master fuel stream 28 to the master turbine combustor 32 may be regulated by a master gas control valve 27 an effective amount to achieve substantially stoichiometric combustion. Additionally, the master compressed ambient gas flow rate of the at least a first portion of the compressed ambient gas flow 26 from the main air compressor 12 to the master turbine combustor 32 may be adjusted using the inlet guide vanes of the main air compressor 12. In some embodiments, the master booster compressor 24 may be adjusted as necessary.

In some embodiments, the air supply valve 15 may be adjusted as necessary. Additionally, in some embodiments, the master air injection valve 25 may be adjusted.

Master Train Extraction

The next step may be extracting a low-oxygen stream from the master train of the exemplary power plant arrangement 420. A master exhaust port, such as the master damper door 38, may be closed. Additionally, the master turbine bypass valve 47 may be closed. At least a portion of the master recirculated gas flow 50 may be extracted using a master extraction conduit 48 that is fluidly connected to the output of the master turbine compressor 30. A master extraction valve 45, which fluidly connects the master extraction conduit 48 to a master gas separation system, may further be opened.

In some embodiments, at least a portion of the master recirculated gas flow 50 from the output of the master turbine compressor 30 may be extracted through the master extraction conduit 48 which may be regulated by a master extraction valve 45. In some embodiments, the master extraction valve 45 may be fluidly connected to the master bypass conduit 49 at a point that is either upstream of or downstream of the master turbine bypass valve 47. In some embodiments, the master extraction conduit 48 may be fluidly connected to a master gas separation system 46 such as a carbon capture sequestration (CCS) system. In still other embodiments, the master gas separation system 46 may produce a stream of concentrated carbon dioxide and concentrated nitrogen, both with a low oxygen content. In some embodiments, the master booster compressor 24 may be adjusted as necessary.

Slave Train Start-Up

In some embodiments, in addition to starting one or more master trains, it may be desirable to also start one or more slave trains. It should be noted, however, that one or more master trains may be started without starting any slave trains. However, no slave trains may be started until at least one master train has been started.

In an embodiment, a method for starting-up the slave train of a stoichiometric exhaust gas recirculation power plant arrangement 420 is provided. Ambient air may be compressed into a compressed ambient gas flow using a main air compressor 12. The inter-train valve 16 may be opened and the slave variable bleed valve 18 may be closed. A slave air injection valve 65, fluidly connecting the inter-train conduit 8 to a slave turbine combustor 72, may be opened. At least a second portion of the compressed ambient gas flow 66, having a slave compressed ambient gas flow rate, may be delivered to a slave turbine combustor 72 that is fluidly connected to the main air compressor 12.

In some embodiments, a slave turbine bypass valve 87 connected to a slave bypass conduit 89 may be opened. The slave bypass conduit 89 may be fluidly connected to an output of a slave turbine compressor 70 and may be configured to deliver a slave bypass flow to a slave recirculation loop 92 at a location that is downstream of a slave turbine 74. Additionally, a slave exhaust port, such as a slave damper door 78, that may be fluidly connected to the slave recirculation loop 92, may be opened such that the slave recirculation loop 92 may be vented to the atmosphere. In some embodiments, the slave exhaust port may be fluidly connected to the slave recirculation loop 92. In other embodiments, the slave exhaust port may be fluidly connected to the slave bypass conduit 89. In still other embodiments, the slave exhaust port may be fluidly connected to the slave extraction conduit 88. In embodiments, the slave exhaust port may vent the slave train to the atmosphere. In other embodiments, the slave exhaust port may not vent the slave train to the atmosphere.

Purging the Slave Train

In some embodiments, the slave train of the exemplary power plant arrangement 420 may be purged just before ignition in order to vent any combustibles that may have accumulated in the slave train prior to ignition. The slave extraction valve 85 and the slave gas control valve 67 must be closed, while the slave air injection valve 65 must be opened for purge. In some embodiments, a slave turbine shaft 62 connected to the slave turbine 74 and to the slave turbine compressor 70 may be rotated at a purge speed. The rotation of the slave turbine shaft 62 might be accomplished with, for instance, a slave turbine generator 60 or a starting motor. In some embodiments, the slave turbine generator 60 may be equipped with a load-commutated inverter to supply rotational power to the slave turbine shaft 62. In some embodiments, the slave turbine shaft 62 may be operated at a purge speed, which may be in the range of about 20% to about 30% of the maximum turbine rotation speed. In other embodiments, the purge speed may be in the range of about 22% to about 28% of the maximum turbine rotation speed. In still other embodiments, the purge speed may be about 25% of the maximum turbine rotation speed. The slave train of the exemplary power plant arrangement 100 may be operated under purge conditions until all volatile combustibles have been vented from the slave train.

During the purge step, the slave air injection valve 65 may be adjusted to control the purge air flow.

In some embodiments, the step of purging may include the use of the slave booster compressor 64 which may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. The exhaust of the slave booster compressor 64 may be delivered to the slave turbine combustor 72. In some embodiments, the exhaust of the slave booster compressor 64 may be regulated by the slave air injection valve 65. In some embodiments, the step of purging may include the use of the slave turbine blower 82 that is located in the slave recirculation loop 92.

In still other embodiments, the purge step is not necessary. In such embodiments, the slave train of the exemplary power plant arrangement 420 has already been purged, for instance during a previous shutdown.

Ignition of the Slave Train

The next step is ignition of the slave train in the exemplary power plant arrangement 420. The slave turbine shaft 62 connected to the slave turbine 74 and to the slave turbine compressor 70 may be rotated at the purge speed or at an ignition speed. The rotation of the slave turbine shaft 62 might be accomplished with, for instance, a slave turbine generator 60 or a starting motor. In some embodiments, the slave turbine generator 60 may be equipped with a load-commutated inverter to supply rotational power to the slave turbine shaft 62. In some embodiments, the ignition speed may be in the range of about 10% to about 20% of the maximum turbine rotation speed. In other embodiments, the ignition speed may be in the range of about 12% to about 16% of the maximum turbine rotation speed. In still other embodiments, the ignition speed may be about 14% of the maximum turbine rotation speed.

A slave fuel stream 68, having a slave fuel stream flow rate, may be delivered to the slave turbine combustor 72 for mixing with the at least a second portion of the compressed ambient gas flow 66 to form a slave combustible mixture. Spark plugs in the slave turbine combustor 72 may be ignited and the slave combustible mixture may be burned in the slave turbine combustor 72 and thereby form the slave recirculated gas flow 90 and drive the slave turbine 74 connected to the slave turbine compressor 70 via the slave turbine shaft 62. As used herein, the term "driving" means that both the slave turbine 74 and the slave turbine compressor 70 rotate. In some embodiments, the slave booster compressor 64 may be adjusted as necessary.

The slave recirculated gas flow 90 may then be recirculated from the slave turbine 74 to the slave turbine compressor 70 using the slave recirculation loop 92. The slave recirculation loop 92 may fluidly connect an output of the slave turbine 74 with an input of the slave turbine compressor 70. The slave recirculated gas flow 90 may further pass through the slave heat recovery steam generator 76, the slave recirculated gas flow cooler 80, and the slave turbine blower 82 en route from the output of the slave turbine 74 to the input of slave turbine compressor 70.

In some embodiments, the slave train may further comprise a slave secondary flow path 71 that may deliver at least a portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual slave turbine components, the slave secondary flow may be directed into the slave recirculation loop 92 near the output of the slave turbine 74. The slave secondary flow path 71 may be used throughout the entire start-up method.

Operating the Slave Train at a Slave Target Operating Speed

The next step is operating the slave turbine 74 at a slave target operating speed. In some embodiments, when the slave turbine 74 is connected to an electrical grid, the target operating speed may be about 3000 rpm for a 50 Hz grid or about 3600 rpm for a 60 Hz grid. In other embodiments, when the slave turbine 74 is not connected to an electrical grid, the slave target operating speed may match the required speed of auxiliary apparatus for which the slave turbine 74 is driving. In some embodiments, the master target operating speed and the slave target operating speed are the same. In other embodiments, the master target operating speed and the slave target operating speed are not the same.

In some embodiments, the slave turbine 74 may be operating at a slave target operating speed after ignition. In other embodiments, the slave turbine 74 may need to be accelerated to a slave target operating speed after ignition. In some embodiments, the slave turbine 74 may be accelerated to a slave target operating speed by adjusting the slave fuel stream flow rate and the slave compressed ambient gas flow rate.

In embodiments where the slave turbine generator 60 is equipped with a load-commutated inverter to supply rotational power to the slave turbine shaft 62 during a purge step, the load-commutated inverter may be used to accelerate the slave turbine shaft 62 until the burning of the slave combustible mixture provides a slave turbine power that is enough to sustain the power needs of the slave turbine compressor 70. In some embodiments, the inverter may be disengaged before or during acceleration of the slave turbine 74. The slave turbine 74 may be driven by the slave recirculated gas flow 90 generated by combustion in the slave turbine combustor 72. In some embodiments, the step of acceleration may comprise adjusting the slave fuel stream flow rate by adjusting the slave gas control valve 67. In some embodiments, the step of acceleration may comprise adjusting the slave booster compressor 64. In some embodiments, the slave variable bleed valve 18 may be closed to facilitate acceleration. In some embodiments, the air supply valve 15 may be adjusted during acceleration as necessary.

In this embodiment, the slave recirculated gas flow 90 may expand in the slave turbine 74, thereby causing the slave turbine 74 to rotate. As used herein, the term "driven using the slave recirculated gas flow" means the slave recirculated gas flow 90 expands upon exit from the slave turbine combustor 72 and upon entrance into the slave turbine 74, thereby causing the slave turbine 74 to rotate. In this embodiment, rotation of the slave turbine 74 causes the slave turbine shaft 62 and the slave turbine compressor 70 to also rotate.

Synchronizing the Slave Train to the Grid and Loading

The next step may be synchronizing the slave train to the power grid. In operation, the slave turbine generator 60 may be synchronized to a power grid and the slave turbine generator 60 may then be electrically connected to the power grid. As used herein, "synchronized to a power grid" means synchronizing the three phases of the alternating current of the slave turbine generator 60 to the three phases of the alternating current of the power grid.

The slave turbine shaft 62 may be connected to the slave turbine generator 60, such that rotation of the slave turbine shaft 62 may cause the slave turbine generator 60 to generate electricity once the slave turbine generator circuit breaker is closed. In some embodiments, a slave circuit breaker connecting the slave turbine generator 60 to the power grid may be closed once the slave turbine generator 60 is synchronized to the power grid.

In some embodiments, the slave train may then be loaded to a desired load point. As used herein, the term "loaded" means that the rotation of the slave turbine shaft 62 in the slave turbine generator 60 is converted from mechanical energy to electrical energy, wherein the electrical energy is transferred to the power grid.

During loading, the slave fuel stream flow rate and the slave compressed ambient gas flow rate may be adjusted as necessary. In some embodiments, the slave booster compressor 64 may be adjusted as necessary.

In some embodiments, the slave recirculated gas flow 90 may be directed through the slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76, in conjunction with the slave steam turbine and slave steam generator, may be configured to generate additional electricity, in conjunction with the slave steam turbine and the slave steam generator, when the temperature of the slave recirculated gas flow 90 is in the range from about 200° C. to about 700° C., from about 260° C. to about 600° C., or from about 300° C. to about 550° C. In some embodiments, the slave steam turbine may be connected to the slave turbine shaft 62.

Slave Train Stoichiometric Combustion

The next step may be reaching substantially stoichiometric combustion in the slave train. The step of reaching substantially stoichiometric combustion may also be performed prior to loading. The step comprises adjusting the slave fuel stream flow rate and the slave compressed ambient gas flow rate to reach substantial combustion stoichiometry. As used herein, the term "substantial combustion stoichiometry" means that the oxygen content after the combustion reaction may be below about 5 vol %, below about 2 vol %, or below about 1 vol %. In operation, the slave fuel stream flow rate of the slave fuel stream 68 to the slave turbine combustor 72 may be regulated by a slave gas control valve 67 an effective amount to achieve substantially stoichiometric combustion. Additionally, the slave compressed ambient gas flow rate of the at least a second portion of the compressed ambient gas flow 66 from the main air compressor 12 to the slave turbine combustor 32 may be adjusted using the slave air injection valve 65. In some embodiments, the slave booster compressor 64 may be adjusted as necessary.

Slave Train Extraction

The next step may be extracting a low-oxygen content gas stream from the slave train of the exemplary power plant arrangement 420. A slave exhaust port, such as the slave damper door 78, may be closed. Additionally, the slave turbine bypass valve 87 may be closed. At least a portion of the slave recirculated gas flow 90 may be extracted using a slave extraction conduit 88 that is fluidly connected to the output of the slave turbine compressor 70. A slave extraction valve 85, which fluidly connects the slave extraction conduit 88 to a slave gas separation system, may further be opened.

In some embodiments, a portion of the slave recirculated gas flow 90 from the output of the slave turbine compressor 70 may be extracted through the slave extraction conduit 88 which may be regulated by a slave extraction valve 85. In some embodiments, the slave extraction valve 85 may be fluidly connected to the slave bypass conduit 89 at a point that is either upstream of or downstream of the slave turbine bypass valve 87. In some embodiments, the slave extraction conduit 88 may be fluidly connected to a slave gas separation system such as a carbon capture sequestration (CCS) system. In still other embodiments, the slave gas separation system may produce a stream of concentrated carbon dioxide and concentrated nitrogen, both with a low oxygen content. In some embodiments, the slave booster compressor 64 may be adjusted as necessary.

In practice, there are various ways to start one or more master trains and one or more slave trains. Initially, each train will have a purge status. If a train has previously been purged, then no purge is needed. If, however, one or more trains have not been previously purged, then purging will be needed. For purging, all unpurged trains may be purged at once, each train may be purged prior to individual starting, or unpurged trains may be purged in waves, as needed.

Once all of the trains that will be started are in a purged state (either by purging or having been purged on a previous shutdown), there are several options for how to start the trains. The one caveat is that at least one master train must be started before a single slave train may be started. In some situations, all trains may be started simultaneously. Other options include starting one master train and then one or more slave trains, followed by starting a second master train and then one or more slave trains. Alternatively, all of the master trains may be started and then all of the slave trains may then be started. Or, each master train may be started individually followed by starting each slave train individually. Another option might be to start all of the master trains, and then start each slave train as needed. In the end, however, any start sequence may lead to any final state wherein one or more master trains are running and one or more slave trains are running.

Method for Operating a Power Plant with a Master Train and a Slave Train

In one embodiment, a method for operating the exemplary power plant arrangement 420 is provided, wherein the inter-train valve 16 may be open. It should be noted that operation of only the master train would comprise the same steps, except the inter-train valve 16 would be closed and steps referring to the slave train would be omitted. Similarly, a power plant arrangement comprising only a master train would follow these same steps, except that steps referring to operation of the slave train would be omitted.

In operation, ambient air may be compressed with a main air compressor 12 to make at least a first portion of a compressed ambient gas flow 26 and at least a second portion of a compressed ambient gas flow 66. The at least a first portion of the compressed ambient gas flow 26 may be delivered from the main air compressor 12 to the master turbine combustor 32 and may be regulated by a master air injection valve 25. The at least a first portion of the compressed ambient gas flow 26 may further be regulated by a master variable bleed valve 14.

The at least a first portion of the compressed ambient gas flow 26 may be mixed, in the master turbine combustor 32, with at least a portion of the master recirculated gas flow 50 and with the master fuel stream 28 to form a master combustible mixture. The master fuel flow rate of the master fuel stream 28 may be regulated by a master gas control valve 27. The master combustible mixture may then ignited and burned in the master turbine combustor 32, thereby forming the master recirculated gas flow 50 and driving both the master turbine 34 and the master turbine compressor 30.

In some embodiments, the at least a second portion of the compressed ambient gas flow 66 may be delivered from the main air compressor 12 to the slave turbine combustor 72 and may be regulated by a slave air injection valve 65. The at least a second portion of the compressed ambient gas flow 66 may be further regulated by a slave variable bleed valve 18. The at least a second portion of the compressed ambient gas flow 66 may be mixed, in the slave turbine combustor 72, with at least a portion of the slave recirculated gas flow 90 and with the slave fuel stream 68 to form a slave combustible mixture. The slave fuel flow rate of the slave fuel stream 68 may be regulated by a slave gas control valve 67. The slave combustible mixture may then be ignited and burned in the slave turbine combustor 72, thereby forming the slave recirculated gas flow 90 and driving both the slave turbine 74 and the slave turbine compressor 70.

As used herein, the term "driving" means the expansion of the master recirculated gas flow 50 in the master turbine 34 thereby causing the master turbine 34 to rotate. The master turbine 34 may be connected to the turbine compressor 30 via the turbine shaft 22, and thus rotation of the master turbine 34 causes rotation of the master turbine compressor 30. The master turbine shaft 22 may also rotate in a master turbine generator 20 and may further generate electricity. Additionally, the term "driving" also means the expansion of the slave recirculated gas flow 90 in the slave turbine 74 thereby causing the slave turbine 74 to rotate. The slave turbine 74 may be connected to the slave turbine compressor 70 via the slave turbine shaft 62, and thus rotation of the slave turbine 74 causes rotation of the slave turbine compressor 70. The slave turbine shaft 62 may also rotate in a slave turbine generator 60 and may further generate electricity.

In some embodiments, at least a portion of the master recirculated gas flow 50 may be recirculated through a master recirculation loop 52. The master recirculation loop 52 may fluidly connect the output of the master turbine 34 with the input of the master turbine compressor 30. The master recirculated gas flow 50 may further pass through the master heat recovery steam generator 36, the master recirculated gas flow cooler 40, and the master turbine blower 42 en route from the output of the master turbine 34 to the input of the master turbine compressor 30.

In some embodiments, at least a portion of the slave recirculated gas flow 90 may be recirculated through a slave recirculation loop 92. The slave recirculation loop 92 may fluidly connect the output of the slave turbine 74 with the input of the slave turbine compressor 70. The slave recirculated gas flow 90 may further pass through the slave heat recovery steam generator 76, the slave recirculated gas flow cooler 80, and the slave turbine blower 82 en route from the output of the slave turbine 74 to the input of the slave turbine compressor 70.

An excess portion, if any, of the master recirculated gas flow 50 may be vented from the system at a location between an output of the master turbine compressor 30 and an input to the master turbine compressor 30. The venting step may be used to prevent over-pressurization of the master gas turbine assembly. In some embodiments, the venting step may be used to reduce the pressure of the master recirculated gas flow 50 that is delivered from the master turbine compressor 30 to the master turbine combustor 32. In some embodiments, the method of operation may further comprise opening a master damper door 38, which may be fluidly connected to the master recirculation loop 52, to the atmosphere.

An excess portion, if any, of the slave recirculated gas flow 90 may be vented from the system at a location between an output of the slave turbine compressor 70 and an input to the slave turbine compressor 70. The venting step may be used to prevent over-pressurization of the slave gas turbine assembly. In some embodiments, the venting step may be used to reduce the pressure of the slave recirculated gas flow 90 that is delivered from the slave turbine compressor 70 to the slave turbine combustor 72. In some embodiments, the method of operation may further comprise opening a slave damper door 78, which may be fluidly connected to the slave recirculation loop 92, to the atmosphere.

In some embodiments, the master train may further comprise a master secondary flow path 31 that may deliver at least a portion of the master recirculated gas flow 50 from the master turbine compressor 30 to the master turbine 34 as a master secondary flow. The master secondary flow may be used to cool and to seal the master turbine 34, including individual components of the master turbine 34 such as the turbine shroud, the turbine nozzle, the turbine blade tip, the turbine bearing support housing, and the like. After cooling and sealing the master turbine 34 and any individual master turbine components, the master secondary flow may be directed into the master recirculation loop 52 downstream of the master turbine 34.

Similarly, in some embodiments the slave train may further comprise a slave secondary flow path 71 that may deliver at least a portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual slave turbine components, the slave secondary flow may be directed into the slave recirculation loop 92 downstream of the slave turbine 74.

In some embodiments, at least a portion of a master turbine compressor 30 exhaust may bypass the master turbine combustor 32 via a master bypass conduit 49 as a master bypass flow. As used herein, the "exhaust" of the master turbine compressor 30 is an output of the master recirculated gas flow 50 from the master turbine compressor 30. The master bypass flow with a master bypass flow rate may be regulated by the master turbine bypass valve 47. Additionally, the master bypass conduit 49 may deliver the master bypass flow to the master recirculation loop 52 downstream of the master turbine 34.

In some embodiments, a portion of the master bypass flow into the master bypass conduit 49 may be extracted as a master extraction flow through a master extraction conduit 48 and may be regulated by a master extraction valve 45. In some embodiments, the master extraction valve 45 may be fluidly connected to the master bypass conduit 49 at a point that is either upstream of or downstream of the master turbine bypass valve 47. In some embodiments, the master extraction flow may be used for one or more secondary processes. In some embodiments, the master extraction flow may be delivered to a master gas separation system. In some embodiments, the master extraction valve 45 may be fluidly connected to a master gas separation system such as a carbon capture sequestration (CCS) system. In still other embodiments, the master gas separation system may produce a stream of concentrated carbon dioxide and concentrated nitrogen, both with a low oxygen content.

In some embodiments, at least a portion of a slave turbine compressor 70 exhaust may bypass the slave turbine combustor 72 via a slave bypass conduit 89 as a slave bypass flow. As used herein, the "exhaust" of the slave turbine compressor 70 is an output of the slave recirculated gas flow 90 from the slave turbine compressor 70. The slave bypass flow with a slave bypass flow rate may be regulated by the slave turbine bypass valve 87. Additionally, the slave bypass conduit 89 may deliver the slave bypass flow to the slave recirculation loop 92 downstream of the slave turbine 74.

In some embodiments, a portion of the slave bypass flow into the slave bypass conduit 89 may be extracted as a slave extraction flow through a slave extraction conduit 88 and may be regulated by a slave extraction valve 85. In some embodiments, the slave extraction valve 85 may be fluidly connected to the slave bypass conduit 89 at a point that is either upstream of or downstream of the slave turbine bypass valve 87. In some embodiments, the slave extraction flow may be used for one or more secondary processes. In some embodiments, the slave extraction flow may be delivered to a slave gas separation system. In some embodiments, the slave extraction valve 85 may be fluidly connected to a slave gas separation system such as a carbon capture sequestration (CCS) system. In still other embodiments, the slave gas separation system may produce a stream of concentrated carbon dioxide and concentrated nitrogen, both with a low oxygen content.

In some embodiments, the master turbine power generated by the combustion of the master combustible mixture may be used to rotate a master turbine shaft 22 that may be configured to generate electricity when rotated in the master turbine generator 20. In some embodiments, the electricity may be generated using substantially stoichiometric combustion. In some embodiments, the slave turbine power generated by the combustion of the slave combustible mixture may be used to rotate a slave turbine shaft 62 that may be configured to generate electricity when rotated in the slave turbine generator 60. In some embodiments, the electricity may be generated using substantially stoichiometric combustion.

In some embodiments, a method for operating an exemplary power plant configuration 420 is provided and may include the use of the master booster compressor 24 which may be incorporated downstream of and in fluid connection with the main air compressor 12 and upstream of and in fluid connection with the master turbine combustor 32. The master booster compressor 24 may further compress the at least a first portion of the compressed ambient gas flow 26 before delivery into the master turbine combustor 32. The exhaust of the master booster combustor 24 may be delivered to the master turbine combustor 32. In some embodiments, the exhaust of the master booster compressor 24 may be regulated by the master air injection valve 25.

In some embodiments, a method for operating the exemplary power plant configuration 420 is provided and may include the use of the slave booster compressor 64 which may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. The exhaust of the slave booster combustor 64 may be delivered to the slave turbine combustor 72. In some embodiments, the exhaust of the slave booster compressor 64 may be regulated by the slave air injection valve 65.

Control Method for a Master Train and a Slave Train

Similar to as discussed above, the control method for a master train and a slave train may also be used as a control method for a power plant arrangement comprising only a master train. In such embodiments, the steps for controlling the slave train would be omitted.

In an embodiment, a method for controlling a master train of a stoichiometric exhaust gas recirculation power plant arrangement 420 is provided, wherein ambient air is compressed using a main air compressor 12 to form at least a first portion of a compressed ambient gas flow 26. An air supply valve 15 that fluidly connects the main air compressor 12 to an inter-train conduit 8 may be opened. Additionally, a master air injection valve 25 that fluidly connects the inter-train conduit 8 to a master turbine combustor 32 may be opened. An excess portion, if any, of the at least a first portion of the compressed ambient gas flow 26 may be vented to the atmosphere via a master variable bleed valve 14.

At least a first portion of the compressed ambient gas flow 26, having a master compressed ambient gas flow rate, may be delivered to a master turbine combustor 32 that is fluidly connected to the main air compressor 12. A master fuel stream 28, having a master fuel stream flow rate, may also be delivered to the master turbine combustor 32. The at least a first portion of the compressed ambient gas flow 26 may then be mixed with at least a portion of a master recirculated low oxygen content gas flow 50 and the master fuel stream 28 to form a master combustible mixture. The master combustible mixture may be burned in the master turbine combustor 32 to produce the master recirculated low oxygen content gas flow 50. In some embodiments, the master fuel stream flow rate may be controlled by a master gas control valve 27.

A master turbine 34 may be driven using the master recirculated low oxygen content gas flow 50, thereby causing the master turbine 34 to rotate. As used herein, the term "driven using the master recirculated low oxygen content gas flow" means the master recirculated low oxygen content gas flow 50 expands upon exit from the master turbine combustor 32 and upon entrance into the master turbine 34, thereby causing the master turbine 34 to rotate.

The rotation of the master turbine 34 may cause the master turbine shaft 22 and also the master turbine compressor 30 to rotate. The master turbine shaft 22 may rotate in a master turbine generator 20, such that rotation of the master turbine shaft 22 may cause the master turbine generator 20 to generate electricity. In embodiments, the master turbine compressor 30 may be fluidly connected to the master turbine combustor 32 such that the master turbine compressor 30 may compress and deliver the master recirculated low oxygen content gas flow 50 to the master turbine combustor 32.

At least a portion of the master recirculated gas flow 50 from the output of the master turbine compressor 30 may be extracted through a master extraction conduit 48 which may be regulated by a master extraction valve 45. In some embodiments, the master extraction valve 45 may be fluidly connected to a master bypass conduit 49 at a point that is either upstream of or downstream of a master turbine bypass valve 47. In some embodiments, the master extraction conduit 48 may be fluidly connected to a master gas separation system such as a master carbon capture sequestration (CCS) system. In still other embodiments, the master gas separation system may produce a stream of concentrated carbon dioxide and concentrated nitrogen, both with a low oxygen content. In some embodiments, the master extraction valve 45 may be adjusted to maintain a constant mass balance in the master train of the power plant arrangement 420. As used herein, the term "constant mass balance" means that the system inputs, including fuel and air, are balanced with the system outputs via extraction, including carbon dioxide, nitrogen, and water.

The master compressed ambient gas flow rate and the master fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the master compressed ambient gas flow rate and/or the master fuel stream flow rate may be adjusted based on measurements of oxygen and/or carbon dioxide present in the exhaust of the master turbine 34 and/or in the master recirculated low oxygen content gas flow 50.

The main air compressor 12 may further comprise adjustable inlet guide vanes to control the flow of air into the main air compressor 12. The inlet guide vanes of the main air compressor may be used to regulate the compressed ambient gas flow rate that is delivered to the turbine combustor 32. Additionally, the master turbine compressor 30 may further comprise adjustable inlet guide vanes to control the flow of air into the master turbine compressor 30.

As illustrated in FIG. 25, in some embodiments, the master turbine shaft 22 may be a "cold-end drive" configuration, meaning the master turbine shaft 22 may connect to the master turbine generator 20 at the compressor end of the turbine assembly. In other embodiments, the master turbine shaft 22 may be a "hot-end drive" configuration, meaning the master turbine shaft 22 may connect to the master turbine generator 20 at the master turbine end of the turbine assembly.

As used herein, the term "master recirculated low oxygen content gas flow" refers to the gas flow generated by the burning of the master combustible mixture in the master turbine combustor 32 and flowing through a master recirculation loop 52. In some embodiments, the term "low oxygen content" refers to an oxygen content of below about 5 vol %, below about 2 vol %, or below about 1 vol %. The concentration of oxygen present in the master recirculated low oxygen content gas flow 50 may be detected, upon exit from the master turbine compressor 30 using a first master oxygen sensor or upon exit from the master turbine 34 using a second master oxygen sensor or both.

In some embodiments, the master recirculated low oxygen content gas flow 50 may be directed from the master turbine 34 through the master recirculation loop 52 to a master heat recovery steam generator 36 for the generation of steam. A master steam turbine may be configured to generate additional electricity using the steam from the master heat recovery steam generator 36, and the master steam turbine may be connected to a master steam generator. In some embodiments, the master steam turbine may be arranged to be connected to the master turbine shaft 22. The master recirculated low oxygen content gas flow 50 may then be directed back into the master recirculation loop 52 to a master recirculated gas flow cooler 40. In still other embodiments, the master recirculation loop 52 may not contain a master heat recovery steam generator 36 and the master recirculated low oxygen content gas flow 50 may instead be introduced directly into the master recirculated gas flow cooler 40 upon exit from the master turbine 34. In other embodiments, the master recirculation loop 52 may not comprise the master recirculated gas flow cooler 40.

The master recirculated gas flow cooler 40 may be incorporated into the master recirculation loop 52 anywhere downstream from the master turbine 34. The master recirculated gas flow cooler 40 may be configured to lower the temperature of the master recirculated low oxygen content gas flow 50 to a suitable temperature for downstream delivery into the master turbine compressor 30 via the master recirculation loop 52. In some embodiments, a suitable temperature may be below about 66° C., below about 49° C., or below about 45° C.

In some embodiments, at least a portion of the master recirculated low oxygen content gas flow 50 may be delivered from the master turbine compressor 30 to the master turbine 34 as a master secondary flow. The gas turbine assembly may further comprise a master secondary flow path 31 that delivers at least a portion of the master recirculated low oxygen content gas flow 50 from the master turbine compressor 30 to the master turbine 34 as a master secondary flow. The master secondary flow may be used to cool and seal the master turbine 34, including individual components of the master turbine 34 such as the turbine shroud, the turbine nozzle, the turbine blade tip, the turbine bearing support housing, and the like. After cooling and sealing the master turbine 34 and any individual turbine components, the master secondary flow may be directed into the master recirculation loop 52 near the output of the master turbine 34.

In some embodiments, the master turbine combustor 32 may be bypassed with at least a portion of the master recirculated low oxygen content gas flow 50 using a master bypass conduit 49. The master bypass conduit 49 may be located downstream of the master turbine compressor 30 and may be in fluid connection with a portion of the master recirculated gas flow 50 from the output of the master turbine compressor 30. In some embodiments, a master bypass flow through the master bypass conduit 49 may be regulated by a master turbine bypass valve 47. The master turbine bypass valve 47 may be used to adjust a master bypass flow rate through the master bypass conduit 49. In some embodiments, the master bypass flow may be fluidly connected to the master recirculation loop 52 downstream of the master turbine 34.

In some embodiments, the at least a first portion of the compressed ambient gas flow 26 may be further compressed prior to delivery into the master turbine combustor 32. The at least a first portion of the compressed ambient gas flow 26 may be further compressed by a master booster compressor 24. The master booster compressor 24 may be incorporated downstream from and in fluid connection with the main air compressor 12 and upstream of an in fluid connection with the master turbine combustor 32. In some embodiments, the master compressed ambient gas flow rate may be varied by adjusting the speed of the master booster compressor 24 and/or by adjusting the inlet guide vanes of the master booster compressor 24.

In some embodiments, a master blower 42 may be used to increase the pressure of the master recirculated low oxygen content gas flow 50. The master blower 42 may be fluidly connected to the master recirculation loop 52 upstream of or downstream of the master recirculated gas flow cooler 40. The master blower 42 may be configured to increase the pressure of the master recirculated low oxygen content gas flow 50 prior to delivery into the master turbine compressor 30 via the master recirculation loop 52.

In some embodiments, an excess portion, if any, of the master recirculated low oxygen content gas flow 50 may be vented from the master train. The master train may include a master damper door 38 connected to the master recirculation loop 52. The master damper door 38 may be opened to vent a portion of the master recirculated low oxygen gas content flow 50 to the atmosphere.

In an embodiment, a method for controlling at least one slave train of a stoichiometric exhaust gas recirculation power plant arrangement 100 is provided. An inter-train valve 16 may be opened, fluidly connecting the slave train to the master train. Additionally, a slave air injection valve 65 may be opened to fluidly connect the inter-train conduit 8 to the slave turbine combustor 72. At least a second portion of the compressed ambient gas flow 66 may be delivered directly to a slave turbine combustor 72. An excess portion, if any, of the at least a second portion of the compressed ambient gas flow 66 may be vented to the atmosphere via a slave variable bleed valve 18.

At least a second portion of the compressed ambient gas flow 66, having a slave compressed ambient gas flow rate, may be delivered to a slave turbine combustor 72 that is fluidly connected to the main air compressor 12. A slave fuel stream 68, having a slave fuel stream flow rate, may also be delivered to the slave turbine combustor 72. The at least a second portion of the compressed ambient gas flow 66 may then be mixed with at least a portion of a slave recirculated low oxygen content gas flow 90 and the slave fuel stream 68 to form a slave combustible mixture. The slave combustible mixture may be burned in the slave turbine combustor 72 to produce the slave recirculated low oxygen content gas flow 90. In some embodiments, the slave fuel stream flow rate may be controlled by a slave gas control valve 67.

A slave turbine 74 may be driven using the slave recirculated low oxygen content gas flow 90, thereby causing the slave turbine 74 to rotate. As used herein, the term "driven using the slave recirculated low oxygen content gas flow" means the slave recirculated low oxygen content gas flow 90 expands upon exit from the slave turbine combustor 72 and upon entrance into the slave turbine 74, thereby causing the slave turbine 74 to rotate.

The rotation of the slave turbine 74 may cause the slave turbine shaft 62 and also the slave turbine compressor 70 to rotate. The slave turbine shaft 62 may rotate in a slave turbine generator 60, such that rotation of the slave turbine shaft 62 may cause the slave turbine generator 60 to generate electricity. In embodiments, the slave turbine compressor 70 may be fluidly connected to the slave turbine combustor 72 such that the slave turbine compressor 70 may compress and deliver the slave recirculated low oxygen content gas flow 90 to the slave turbine combustor 72.

At least a portion of the slave recirculated gas flow 90 from the output of the slave turbine compressor 70 may be extracted through a slave extraction conduit 88 which may be regulated by a slave extraction valve 85. In some embodiments, the slave extraction valve 85 may be fluidly connected to a slave bypass conduit 89 at a point that is either upstream of or downstream of a slave turbine bypass valve 87. In some embodiments, the slave extraction conduit 88 may be fluidly connected to a slave gas separation system such as a slave carbon capture sequestration (CCS) system. In still other embodiments, the slave gas separation system may produce a stream of concentrated carbon dioxide and concentrated nitrogen, both with a low oxygen content. In some embodiments, the slave extraction valve 85 may be adjusted to maintain a constant mass balance in the slave train of the power plant arrangement 100. As used herein, the term "constant mass balance" means that the system inputs, including fuel and air, are balanced with the system outputs via extraction, including carbon dioxide, nitrogen, and water.

The slave compressed ambient gas flow rate and the slave fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the slave compressed ambient gas flow rate and/or the slave fuel stream flow rate may be adjusted based on measurements of oxygen and/or carbon dioxide present in the exhaust of the slave turbine 74 and/or in the slave recirculated low oxygen content gas flow 90.

The slave turbine compressor 70 may further comprise adjustable inlet guide vanes to control the flow of air into the slave turbine compressor 70.

As illustrated in FIG. 25, in some embodiments, the slave turbine shaft 62 may be a "cold-end drive" configuration, meaning the slave turbine shaft 62 may connect to the slave turbine generator 60 at the compressor end of the slave train. In other embodiments, the slave turbine shaft 62 may be a "hot-end drive" configuration, meaning the slave turbine shaft 62 may connect to the slave turbine generator 60 at the slave turbine end of the slave train.

As used herein, the term "slave recirculated low oxygen content gas flow" refers to the gas flow generated by the burning of the slave combustible mixture in the slave turbine combustor 72 and flowing through a slave recirculation loop 92. In some embodiments, the term "low oxygen content" refers to an oxygen content of below about 5 vol %, below about 2 vol %, or below about 1 vol %. The concentration of oxygen present in the slave recirculated low oxygen content gas flow 90 may be detected, upon exit from the slave turbine compressor 70 using a first slave oxygen sensor or upon exit from the slave turbine 74 using a second slave oxygen sensor or both.

In some embodiments, the slave recirculated low oxygen content gas flow 90 may be directed from the slave turbine 74 through the slave recirculation loop 92 to a slave heat recovery steam generator 76 for the generation of steam. A slave steam turbine may be configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to a slave recirculated gas flow cooler 80. In still other embodiments, the slave recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream from the slave turbine 74. The slave recirculated gas flow cooler 80 may be configured to lower the temperature of the slave recirculated low oxygen content gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, at least a portion of the slave recirculated low oxygen content gas flow 90 may be delivered from the slave turbine compressor 70 to the slave turbine 74 as a slave secondary flow. The slave train may further comprise a slave secondary flow path 71 that delivers at least a third portion of the slave recirculated low oxygen content gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave turbine combustor 72 may be bypassed with at least a portion of the slave recirculated low oxygen content gas flow 90 using a slave bypass conduit 89. The slave bypass conduit 89 may be located downstream of the slave turbine compressor 70 and may be in fluid connection with a portion of the slave recirculated gas flow 90 from the output of the slave turbine compressor 70. In some embodiments, a slave bypass flow through the slave bypass conduit 89 may be regulated by a slave turbine bypass valve 87. The slave turbine bypass valve 87 may be used to adjust a slave bypass flow rate through the slave bypass conduit 89. In some embodiments, the slave bypass flow may be fluidly connected to the slave recirculation loop 92 downstream of the slave turbine 74.

In some embodiments, the at least a second portion of the compressed ambient gas flow 66 may be further compressed prior to delivery into the slave turbine combustor 72. The at least a second portion of the compressed ambient gas flow 66 may be further compressed by a slave booster compressor 64. The slave booster compressor 64 may be incorporated downstream from and in fluid connection with the main air compressor 12 and upstream of an in fluid connection with the slave turbine combustor 72. In some embodiments, the slave compressed ambient gas flow rate may be varied by adjusting the speed of the slave booster compressor 64 and/or the inlet guide vanes of the slave booster compressor 64.

In some embodiments, a slave blower 82 may be used to increase the pressure of the slave recirculated low oxygen content gas flow 90. The slave blower 82 may be fluidly connected to the slave recirculation loop 92 upstream of or downstream of the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

In some embodiments, an excess portion, if any, of the slave recirculated low oxygen content gas flow 90 may be vented from the slave train. The slave train may include a slave damper door 78 connected to the slave recirculation loop 92. The slave damper door 78 may be opened to vent a portion of the slave recirculated low oxygen gas content flow 90 to the atmosphere.

Other configurations and methods of operation are provided by U.S. patent applications including "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power-Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

We claim:

1. A power plant arrangement, comprising:
   at least one main air compressor for compressing ambient air into a compressed ambient gas flow; and
   two or more gas turbine assemblies fluidly connected by an inter-train conduit, each comprising:
      a turbine combustor, fluidly connected to the at least one main air compressor, for mixing at least a first portion of the compressed ambient gas flow with at least a first portion of a recirculated low oxygen content gas flow and a fuel stream to form a combustible mixture and for burning the combustible mixture and forming the recirculated low oxygen content gas flow;
      a turbine connected to the turbine combustor and to a turbine shaft, and being arranged to be driven by the recirculated low oxygen content gas flow from the turbine combustor;
      a turbine compressor, fluidly connected to the turbine combustor, and connected to the turbine shaft and being arranged to be driven thereby; and
      a recirculation loop for recirculating at least a portion of the recirculated low oxygen content gas flow from the turbine to the turbine compressor.

2. The power plant arrangement of claim 1, wherein the two or more gas turbine assemblies each further comprise a booster compressor, fluidly connected to the at least one main air compressor and to the turbine combustor, for further compressing the at least a first portion of the compressed ambient gas flow.

3. The power plant arrangement of claim 1, wherein the two or more gas turbine assemblies each further comprise a turbine generator connected to the turbine by the turbine shaft and being arranged to be driven thereby.

4. The power plant arrangement of claim 1, wherein the two or more gas turbine assemblies each further comprise a recirculated gas flow cooler in the recirculation loop, configured to lower the temperature of the recirculated low oxygen content gas flow to a suitable temperature for delivery to the turbine compressor.

5. The power plant arrangement of claim 1, wherein the two or more gas turbine assemblies each further comprise a heat recovery steam generator in the recirculation loop, configured to receive the recirculated low oxygen content gas flow from the turbine for generation of steam using a steam turbine and a steam generator.

6. The power plant arrangement of claim 1, wherein the at least one main air compressor is arranged to be connected to the turbine shaft.

7. The power plant arrangement of claim 6, wherein the at least one main air compressor is arranged to be driven by the turbine shaft.

8. The power plant arrangement of claim 1, wherein the two or more gas turbine assemblies each further comprise a blower in the recirculation loop, configured to increase the pressure of the recirculated low oxygen content gas flow delivered to the turbine compressor.

9. The power plant arrangement of claim 8, wherein the blower is located in the recirculation loop downstream of a recirculated gas flow cooler.

10. The power plant arrangement of claim 8, wherein the blower is located in the recirculation loop upstream of a recirculated gas flow cooler.

11. The power plant arrangement of claim 1, wherein the two or more gas turbine assemblies each further comprise a recirculated gas flow extraction unit for extracting at lease a second portion of the recirculated low oxygen content gas flow from the respective gas turbine assembly.

12. The power plant arrangement of claim 11, wherein a gas separation system is fluidly connected to the recirculated gas flow extraction unit and the gas separation system is configured to produce at least a first process stream of concentrated carbon dioxide and a second process stream of concentrated nitrogen, both with a low oxygen content.

13. The power plant arrangement of claim 1, wherein the two or more gas turbine assemblies each further comprise a secondary flow path that delivers at least a second portion of the recirculated low oxygen content gas flow from the turbine compressor to the turbine as a secondary flow, and the secondary flow is further delivered into the recirculation loop after cooling and sealing the turbine.

14. The power plant arrangement of claim 1, wherein the power plant is configured for substantially stoichometric combustion.

15. A method for operating a power plant, comprising:
compressing ambient air with at least one main air compressor to form a compressed ambient gas flow;
delivering at least a first portion of the compressed ambient gas flow to at least one gas turbine assembly of a power plant comprising two or more gas turbine assemblies that are fluidly connected by an inter-train conduit, wherein the inter-train conduit further comprises an inter-train valve that is in a closed position and wherein a method for operating the at least one gas turbine assembly comprises:
mixing the at least a first portion of the compressed ambient gas flow with at least a first portion of a recirculated low oxygen content gas flow and a fuel stream to form a combustible mixture and burning the mixture in a turbine combustor to produce the recirculated low oxygen content gas flow;
driving a turbine, connected to a turbine shaft, using the recirculated low oxygen content gas flow;
driving a turbine compressor, via the turbine shaft, which is fluidly connected to the turbine combustor; and
recirculating at least a portion of the recirculated low oxygen content gas flow from the turbine to the turbine compressor using a recirculation loop.

16. The method of operating a power plant according to claim 15, wherein electricity is generated with substantially stoichiometric combustion.

17. The method of operating a power plant according to claim 15, further comprising extracting a second portion of the recirculated low oxygen content gas flow from the gas turbine assembly using a recirculated gas flow extraction unit.

18. The method of operating a power plant according to claim 15, further comprising driving a turbine generator connected to the turbine to generate electricity.

* * * * *